(12) United States Patent
Chopra et al.

(10) Patent No.: US 12,099,368 B2
(45) Date of Patent: *Sep. 24, 2024

(54) COMMUNICATION SYSTEMS FOR SELF-DRIVING VEHICLES, AND METHODS OF PROVIDING THEREOF

(71) Applicant: Clearpath Robotics Inc., Kitchener (CA)

(72) Inventors: Smriti Chopra, Waterloo (CA); Ryan Christopher Gariepy, Kitchener (CA); Shahab Kaynama, Mountain View, CA (US); Pavel Bovbel, Kitchener (CA); Andrei Petru Ionescu, Waterloo (CA); Jason Mercer, Kitchener (CA)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 157 days.

This patent is subject to a terminal disclaimer.

(21) Appl. No.: 17/574,981

(22) Filed: Jan. 13, 2022

(65) Prior Publication Data
US 2022/0214698 A1  Jul. 7, 2022

Related U.S. Application Data

(63) Continuation of application No. 16/268,555, filed on Feb. 6, 2019, now Pat. No. 11,256,270.
(Continued)

(51) Int. Cl.
*G05D 1/02* (2020.01)
*G05D 1/00* (2006.01)
(Continued)

(52) U.S. Cl.
CPC ......... *G05D 1/0293* (2013.01); *G05D 1/0297* (2013.01); *G07C 5/008* (2013.01);
(Continued)

(58) Field of Classification Search
CPC .............. G05D 1/0293; G05D 1/0297; G05D 2201/0213; G05D 2201/0216; G05D 1/00;
(Continued)

(56) References Cited

U.S. PATENT DOCUMENTS

| 5,199,524 A | 4/1993 | Ivancic |
| 6,668,318 B1 | 12/2003 | Jenkins et al. |

(Continued)

FOREIGN PATENT DOCUMENTS

| WO | WO-2010089299 A1 * | 8/2010 | ............. G08G 1/205 |
| WO | 2013096651 A1 | 6/2013 | |
| WO | 2017072771 A1 | 5/2017 | |

OTHER PUBLICATIONS

WO-2010089299-A1 English translation (Year: 2010).*
(Continued)

*Primary Examiner* — Angelina M Shudy

(57) ABSTRACT

Systems and methods for providing inter-vehicle communication are disclosed. The method includes receiving, at a fleet management system, operating data from one or more self-driving vehicles via a communication network, and operating the fleet management system to determine a characteristic of a set of vehicles of one or more self-driving vehicles satisfies at least one communication condition. In response to determining the set of vehicles satisfies the at least one communication condition, the fleet management system can operate to select a stored data portion from a manager storage unit based at least on the characteristic of the set of vehicles; and transmit the data portion to the set of vehicles via the communication network. A method of providing inter-vehicle communication between one or more self-driving vehicles is also disclosed.

20 Claims, 10 Drawing Sheets

Related U.S. Application Data

(60) Provisional application No. 62/627,301, filed on Feb. 7, 2018.

(51) Int. Cl.
  *G07C 5/00* (2006.01)
  *H04W 4/44* (2018.01)
  *H04W 4/46* (2018.01)
  *H04L 67/12* (2022.01)
  *H04W 4/02* (2018.01)

(52) U.S. Cl.
  CPC .............. *H04W 4/44* (2018.02); *H04W 4/46* (2018.02); *H04L 67/12* (2013.01); *H04W 4/02* (2013.01); *H04W 4/023* (2013.01); *H04W 4/027* (2013.01)

(58) Field of Classification Search
  CPC .......... G07C 5/008; H04W 4/44; H04W 4/46; H04W 4/02; H04W 4/023; H04W 4/027; H04L 67/12; G08G 1/00; G01C 21/00
  See application file for complete search history.

(56) References Cited

U.S. PATENT DOCUMENTS

| | | |
|---|---|---|
| 7,409,356 B1 | 8/2008 | Geddes et al. |
| 7,532,962 B1 | 5/2009 | Lowrey et al. |
| 7,565,581 B1 | 7/2009 | Halligan et al. |
| 7,650,210 B2 | 1/2010 | Breed |
| 7,734,389 B2 | 6/2010 | Shin |
| 7,826,919 B2 | 11/2010 | D'Andrea et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 8,190,322 B2 | 5/2012 | Lin et al. |
| 8,220,710 B2 | 7/2012 | Hoffman et al. |
| 8,457,808 B2 | 6/2013 | Michnik et al. |
| 8,502,498 B2 | 8/2013 | Fecher |
| 8,660,740 B2 | 2/2014 | Koniditsiotis et al. |
| 8,761,989 B1 | 6/2014 | Murphy |
| 8,914,182 B2 | 12/2014 | Casado et al. |
| 9,315,178 B1 | 4/2016 | Ferguson et al. |
| 9,606,544 B2 | 3/2017 | Gariepy et al. |
| 9,740,212 B2 | 8/2017 | D'Andrea |
| 9,766,671 B2 | 9/2017 | Dorn et al. |
| 10,055,903 B2 | 8/2018 | Koons et al. |
| 10,089,873 B2 | 10/2018 | Yamasaki et al. |
| 10,109,120 B2 | 10/2018 | Boss et al. |
| 10,138,101 B2 | 11/2018 | Svensson et al. |
| 10,155,646 B2 | 12/2018 | Lee |
| 10,179,591 B2* | 1/2019 | Todasco ................. H04W 4/40 |
| 10,209,711 B1* | 2/2019 | Brazeau ............... G05D 1/0212 |
| 10,241,509 B1 | 3/2019 | Fields et al. |
| 10,262,475 B2 | 4/2019 | Smith |
| 10,423,934 B1 | 5/2019 | Zanghi et al. |
| 10,346,797 B2 | 7/2019 | Jacobus et al. |
| 10,565,807 B2 | 2/2020 | Boss et al. |
| 10,671,087 B2 | 6/2020 | Collett et al. |
| 10,717,448 B1 | 7/2020 | Seo |
| 10,726,644 B2 | 7/2020 | Abari et al. |
| 10,747,234 B1* | 8/2020 | Konrardy ............. G06F 11/3692 |
| 10,802,493 B2 | 10/2020 | Ogihara et al. |
| 10,824,145 B1 | 11/2020 | Konrardy |
| 10,846,947 B2 | 11/2020 | Pakki et al. |
| 10,867,455 B2 | 12/2020 | Segal et al. |
| 10,948,927 B1* | 3/2021 | Harris ....................... G08G 1/22 |
| 11,100,731 B2 | 8/2021 | Smith |
| 11,235,778 B2 | 2/2022 | Tod |
| 11,256,270 B2* | 2/2022 | Chopra ................... H04W 4/44 |
| 11,493,586 B2 | 11/2022 | Pipher et al. |
| 11,531,352 B2 | 12/2022 | Thode et al. |
| 11,638,133 B1* | 4/2023 | O'Grady ............... H04W 24/08 |
| | | 709/217 |
| 11,648,953 B2 | 5/2023 | Tod |
| 2001/0044697 A1* | 11/2001 | Kageyama ............. G08G 1/207 |
| | | 701/482 |
| 2004/0039504 A1 | 2/2004 | Coffee |
| 2004/0158355 A1 | 8/2004 | Holmqvist et al. |
| 2007/0005202 A1 | 1/2007 | Breed |
| 2007/0129847 A1 | 6/2007 | Ulmer et al. |
| 2008/0009965 A1 | 1/2008 | Bruemmer et al. |
| 2008/0009966 A1 | 1/2008 | Bruemmer et al. |
| 2008/0028237 A1 | 1/2008 | Knight |
| 2008/0262669 A1 | 10/2008 | Smid et al. |
| 2008/0284575 A1 | 11/2008 | Breed |
| 2008/0291879 A1 | 11/2008 | Duff et al. |
| 2009/0043441 A1 | 2/2009 | Breed |
| 2009/0074545 A1 | 3/2009 | Lert, Jr. et al. |
| 2009/0077808 A1 | 3/2009 | Malm |
| 2009/0160255 A1 | 6/2009 | Grady |
| 2009/0304101 A1 | 12/2009 | Loporto et al. |
| 2010/0060604 A1 | 3/2010 | Zwart et al. |
| 2010/0100315 A1 | 4/2010 | Davidson et al. |
| 2011/0031929 A1 | 2/2011 | Asada et al. |
| 2011/0144823 A1 | 6/2011 | Muller et al. |
| 2011/0202305 A1 | 8/2011 | Willis |
| 2012/0019205 A1 | 1/2012 | Kressner et al. |
| 2012/0101627 A1 | 4/2012 | Lert |
| 2012/0123614 A1 | 5/2012 | Laws et al. |
| 2012/0179337 A1 | 7/2012 | Doan |
| 2012/0239224 A1 | 9/2012 | Mccabe et al. |
| 2013/0000438 A1 | 1/2013 | Ouellet |
| 2013/0006677 A1 | 1/2013 | Anglin et al. |
| 2013/0035823 A1 | 2/2013 | Yoshida |
| 2013/0039357 A1* | 2/2013 | Akita ....................... H04W 4/46 |
| | | 370/338 |
| 2013/0179057 A1 | 7/2013 | Fisher et al. |
| 2013/0248547 A1 | 9/2013 | Braun et al. |
| 2013/0329651 A1* | 12/2013 | Lee ........................ H04W 52/04 |
| | | 370/329 |
| 2014/0074345 A1 | 3/2014 | Gabay et al. |
| 2014/0139354 A1* | 5/2014 | Miyazaki ........... G08G 1/096725 |
| | | 340/902 |
| 2014/0142785 A1 | 5/2014 | Fuentes et al. |
| 2014/0244097 A1 | 8/2014 | Colwell |
| 2014/0303768 A1 | 10/2014 | Klumpp et al. |
| 2014/0303814 A1 | 10/2014 | Burema et al. |
| 2014/0308098 A1 | 10/2014 | Lert et al. |
| 2014/0344118 A1 | 11/2014 | Parpia et al. |
| 2014/0350725 A1 | 11/2014 | Lafary et al. |
| 2014/0360832 A1 | 12/2014 | Aldrich |
| 2014/0365258 A1 | 12/2014 | Vestal et al. |
| 2014/0379205 A1 | 12/2014 | Muetzel et al. |
| 2015/0006005 A1 | 1/2015 | Yu et al. |
| 2015/0091507 A1 | 4/2015 | Hyde et al. |
| 2015/0100504 A1 | 4/2015 | Binion et al. |
| 2015/0141043 A1* | 5/2015 | Abramson ............. G01C 21/34 |
| | | 455/456.1 |
| 2015/0148951 A1 | 5/2015 | Jeon et al. |
| 2015/0161830 A1 | 6/2015 | Lenhardt et al. |
| 2015/0224891 A1 | 8/2015 | Petrosian et al. |
| 2015/0260535 A1* | 9/2015 | Yoshida ................. G05D 1/0297 |
| | | 701/25 |
| 2015/0339928 A1 | 11/2015 | Ramanujam |
| 2015/0360865 A1 | 12/2015 | Massey |
| 2015/0379704 A1 | 12/2015 | Chandrasekar et al. |
| 2016/0061935 A1* | 3/2016 | McCloskey ........... G01S 7/4008 |
| | | 342/82 |
| 2016/0063435 A1 | 3/2016 | Shah et al. |
| 2016/0071418 A1* | 3/2016 | Oshida .................... B60K 28/06 |
| | | 701/23 |
| 2016/0093119 A1 | 3/2016 | Ahn et al. |
| 2016/0116587 A1 | 4/2016 | Miller et al. |
| 2016/0121487 A1 | 5/2016 | Mohan et al. |
| 2016/0236867 A1 | 8/2016 | Brazeau et al. |
| 2016/0247106 A1 | 8/2016 | Dalloro et al. |
| 2016/0342915 A1* | 11/2016 | Humphrey ........... G05D 1/0297 |
| 2017/0092131 A1 | 3/2017 | Fairfield et al. |
| 2017/0120906 A1* | 5/2017 | Penilla ................. B60W 30/08 |
| 2017/0123421 A1 | 5/2017 | Kentley et al. |
| 2017/0123428 A1 | 5/2017 | Levinson |
| 2017/0124781 A1 | 5/2017 | Douillard |

(56) References Cited

U.S. PATENT DOCUMENTS

| | | |
|---|---|---|
| 2017/0192438 A1* | 7/2017 | Morimoto .............. B60W 40/13 |
| 2017/0205833 A1 | 7/2017 | Gariepy et al. |
| 2017/0212526 A1* | 7/2017 | Vanderpool ........... H04W 4/023 |
| 2017/0242095 A1* | 8/2017 | Schuh ................... G05D 1/0293 |
| 2017/0262709 A1* | 9/2017 | Wellington ........... G06V 10/764 |
| 2017/0263120 A1 | 9/2017 | Durie, Jr. et al. |
| 2017/0300054 A1 | 10/2017 | Hanson et al. |
| 2017/0357270 A1* | 12/2017 | Russell .................. G06V 20/58 |
| 2018/0005181 A1 | 1/2018 | Gaussin |
| 2018/0013211 A1 | 1/2018 | Ricci |
| 2018/0053141 A1 | 2/2018 | Shydo, Jr. |
| 2018/0059687 A1 | 3/2018 | Hayes et al. |
| 2018/0113468 A1* | 4/2018 | Russell .................. G06V 20/10 |
| 2018/0115898 A1* | 4/2018 | Han ........................ G01S 19/42 |
| 2018/0143649 A1 | 5/2018 | Miao et al. |
| 2018/0151066 A1* | 5/2018 | Oba .................. B60W 60/0053 |
| 2018/0164825 A1 | 6/2018 | Matus et al. |
| 2018/0188725 A1* | 7/2018 | Cremona ............. G05D 1/0295 |
| 2018/0204398 A1 | 7/2018 | Smith |
| 2018/0204458 A1 | 7/2018 | Fairfield et al. |
| 2018/0227729 A1* | 8/2018 | Bai ..................... G01C 21/3453 |
| 2018/0232961 A1* | 8/2018 | Wang .................... H04W 4/023 |
| 2018/0247207 A1 | 8/2018 | Ristovski et al. |
| 2018/0276604 A1* | 9/2018 | Gariepy ............... G06Q 10/087 |
| 2018/0313282 A1 | 11/2018 | Pati et al. |
| 2018/0342113 A1 | 11/2018 | Kislovskiy |
| 2018/0356821 A1 | 12/2018 | Kentley-Klay et al. |
| 2018/0362032 A1* | 12/2018 | Yang ...................... G08G 1/167 |
| 2018/0373238 A1* | 12/2018 | Bergan ................. G08G 5/0069 |
| 2019/0005748 A1 | 1/2019 | Boss et al. |
| 2019/0025818 A1* | 1/2019 | Mattingly ............. H04L 9/3297 |
| 2019/0025819 A1* | 1/2019 | Ferguson ............... B60W 30/12 |
| 2019/0028862 A1* | 1/2019 | Futaki ..................... H04W 4/44 |
| 2019/0033882 A1* | 1/2019 | Collett .................. G08G 1/162 |
| 2019/0047564 A1* | 2/2019 | Brady .................. B60W 30/181 |
| 2019/0061619 A1 | 2/2019 | Reymann |
| 2019/0064810 A1 | 2/2019 | Jiang et al. |
| 2019/0107840 A1* | 4/2019 | Green ................... G05D 1/0221 |
| 2019/0171225 A1* | 6/2019 | Switkes ................ B60W 50/14 |
| 2019/0196480 A1 | 6/2019 | Taylor |
| 2019/0220011 A1 | 7/2019 | Della Penna |
| 2019/0225233 A1 | 7/2019 | Tod et al. |
| 2019/0235506 A1* | 8/2019 | Bardapurkar ........ G01C 21/005 |
| 2019/0243384 A1* | 8/2019 | Chopra .................. H04W 4/46 |
| 2019/0248013 A1* | 8/2019 | Deyle ..................... B25J 13/006 |
| 2019/0272760 A1* | 9/2019 | McQuillen ............. G08G 1/163 |
| 2019/0276055 A1* | 9/2019 | Cooper .................. B60L 15/34 |
| 2019/0279513 A1* | 9/2019 | Schuh .................... H04W 4/46 |
| 2020/0077241 A1* | 3/2020 | Bae ....................... H04W 72/541 |
| 2020/0143610 A1 | 5/2020 | Boss et al. |
| 2020/0143675 A1* | 5/2020 | Chopra .................... H04W 4/46 |
| 2020/0153494 A1* | 5/2020 | Park ...................... H04B 7/0617 |
| 2020/0167722 A1 | 5/2020 | Goldberg |
| 2020/0174493 A1 | 6/2020 | Lin et al. |
| 2020/0183371 A1* | 6/2020 | Park ...................... G05D 1/0229 |
| 2020/0187086 A1* | 6/2020 | Vandikas .............. H04L 45/748 |
| 2020/0201336 A1* | 6/2020 | Myers .................. G05D 1/0022 |
| 2020/0207360 A1* | 7/2020 | Dougherty ........... G06V 20/584 |
| 2020/0207371 A1* | 7/2020 | Dougherty ........... G05D 1/0293 |
| 2020/0262453 A1* | 8/2020 | Mimura ................. G08G 1/202 |
| 2020/0286369 A1* | 9/2020 | Ferrin .................... G06V 20/56 |
| 2020/0294401 A1 | 9/2020 | Kerecsen |
| 2020/0342768 A1* | 10/2020 | Zhao ....................... H04W 4/08 |
| 2020/0348662 A1 | 11/2020 | Cella |
| 2020/0361480 A1 | 11/2020 | Rodriguez Bravo et al. |
| 2020/0393849 A1* | 12/2020 | Ishikawa .............. G05D 1/0214 |
| 2021/0005080 A1* | 1/2021 | Ogawa .................. H04W 24/10 |
| 2021/0012592 A1 | 1/2021 | Abari et al. |
| 2021/0037361 A1* | 2/2021 | Zhang .................... H04W 4/70 |
| 2021/0064057 A1 | 3/2021 | Eldar et al. |
| 2021/0112368 A1* | 4/2021 | Whelen ........... G08G 1/096775 |
| 2021/0116582 A1* | 4/2021 | Krause ..................... G06N 7/01 |
| 2021/0157312 A1 | 5/2021 | Cella |
| 2022/0021597 A1* | 1/2022 | Cui ....................... H04M 15/58 |
| 2022/0139209 A1* | 5/2022 | Biala ................... H04L 67/60 701/1 |
| 2022/0214698 A1* | 7/2022 | Chopra ................ G05D 1/0293 |
| 2022/0297700 A1* | 9/2022 | Dougherty ........... G05D 1/0088 |
| 2023/0161623 A1* | 5/2023 | Orbay ................... H04W 12/08 718/104 |
| 2023/0251342 A1* | 8/2023 | Zhu ........................ G01S 13/765 455/456.1 |
| 2023/0260395 A1* | 8/2023 | Ishiwatari ............ G08G 1/0112 701/117 |
| 2023/0276210 A1* | 8/2023 | Cui ......................... H04W 4/40 701/300 |
| 2023/0294031 A1* | 9/2023 | Kolczyk ................ B60K 35/00 |
| 2024/0028391 A1* | 1/2024 | Alezzani .................. G07C 5/08 |
| 2024/0102817 A1* | 3/2024 | Bales ................... G01C 21/3492 |
| 2024/0106888 A1* | 3/2024 | Bales ..................... H04L 67/12 |

OTHER PUBLICATIONS

International Preliminary Report on Patentability of the ISA, Aug. 20, 2020 re PCT International Application No. PCT/CA2019/050156. (7 pages).

Eric Park, Linda Kobayashi and Susan Lee: "Extensible Hardware Architecture for Mobile Robots" Intelligent Robotics Group Apr. 18, 2005.(6 pages).

* cited by examiner

COMMUNICATION SYSTEMS FOR SELF-DRIVING VEHICLES, AND METHODS OF PROVIDING THEREOF

CROSS-REFERENCE TO RELATED APPLICATIONS

This application is a Continuation of U.S. patent application Ser. No. 16/268,555, filed 6 Feb. 2019, which claims the benefit of U.S. Provisional Patent Application No. 62/627,301, filed 7 Feb. 2018, and titled "COMMUNICATION SYSTEMS FOR SELF-DRIVING VEHICLES, AND METHODS OF PROVIDING THEREOF", the complete disclosure of each of U.S. patent application Ser. No. 16/268,555 and U.S. Provisional Patent Application No. 62/627,301 is incorporated herein by reference for all purposes.

FIELD

The described embodiments relate to communication systems for self-driving vehicles, and in particular, systems and methods of providing inter-vehicle communication for self-driving vehicles.

BACKGROUND

An automated guided vehicle ("AGV") operates along pre-determined paths that are defined by specific infrastructure, such as a magnetic strip. AGVs cannot deviate from the pre-determined path. Self-driving vehicles, such as a self-driving transport vehicle, are not limited to a specific infrastructure and are not limited to a pre-determined path. Some self-driving vehicles can sense its environment and navigate its environment with minimal, or even possibly with no, human input.

A self-driving vehicle typically stores an electronic map of its environment and identifies its position within the environment by referring to the stored electronic map and what it has sensed from its environment. However, the stored electronic map can become outdated as the environment changes and will unlikely show traffic caused by self-driving vehicles, human-operated vehicles, and pedestrians.

Management of self-driving vehicles can, therefore, be difficult. Even with a central authority, the central authority may not always have the most updated information on the self-driving vehicles since at least some of the operating decisions are made by the self-driving vehicles. Ideally, each self-driving vehicle should constantly transfer its data to the other self-driving vehicles and the central authority without any restrictions. Unfortunately, data communication in most environments is constrained by various factors, such as infrastructure limitations, communication-related overhead (e.g., memory, bandwidth, or other resources), and data transfer latency. Effective communication between the self-driving vehicles (inter-vehicle communication) and communication between the self-driving vehicles and the central authority, can be critical.

SUMMARY

The various embodiments described herein generally relate to methods (and associated systems configured to implement the methods) for providing inter-vehicle communication. The method includes receiving, at a fleet management system, operating data from one or more self-driving vehicles via a communication network; operating the fleet management system to determine a characteristic of a set of vehicles of one or more self-driving vehicles satisfies at least one communication condition; in response to determining the set of vehicles satisfies the at least one communication condition, operating the fleet management system to select a stored data portion from a manager storage unit based at least on the characteristic of the set of vehicles; and transmitting the data portion to the set of vehicles via the communication network.

In some embodiments, the set of vehicles can include one or more vehicles.

In some embodiments, the method can further include receiving, by a vehicle of the set of vehicles, the stored data portion from the fleet management system; and determining, by the vehicle, a response based on the received stored data portion.

In some embodiments, the method can further include transmitting, by a vehicle of the set of vehicles, at least one operating data portion to the fleet management system.

In some embodiments, the method can involve operating the vehicle to determine a critical transmission period for the at least one operating data portion; and transmitting the at least one operating data portion before or during the critical transmission period.

In some embodiments, the vehicle can be operated to transmit the at least one operating data portion when the vehicle is within a proximity threshold of the fleet management system.

In some embodiments, the characteristic of the set of vehicles can include a position of each vehicle. The at least one communication condition can include a vehicular proximity threshold between any two vehicles; and the manager processor can be operable to select the stored data portion associated with a position of each vehicle and a velocity of each vehicle.

In some embodiments, the position of each vehicle can include an initial position. The initial position can be a position of that vehicle during a last data communication session between that vehicle and the fleet management system.

In some embodiments, the position of each vehicle can include an estimated position at a subsequent time. The estimated position can be determined from the initial position of that vehicle and a velocity to that vehicle at the initial position.

In some embodiments, the characteristic of the set of vehicles can include a position of each vehicle. The at least one communication condition can include an environment proximity threshold between that vehicle and one or more features of an environment of the one or more self-driving vehicles. The fleet management system can be operable to select the stored data portion associated with a position of each one or more self-driving vehicles, a velocity of each vehicle and a current mission of each self-driving vehicle.

In some embodiments, the characteristic of the set of vehicles can include a functionality of each vehicle. The at least one communication condition can include a functionality requirement. The fleet management system can be operable to select the stored data portion associated with a position of each vehicle and a current mission of each vehicle.

In some embodiments, the functionality requirement can include at least one of a manipulator type and an application installed in the vehicle memory of the first vehicle.

In some embodiments, the manipulator type can include a sensor type and an end effector type.

In some embodiments, the characteristic of the set of vehicles can include a team member identifier. The at least one communication condition can include a team identifier. The fleet management system can be operable to select the stored data portion associated with a position of each vehicle and a current mission of each vehicle.

In some embodiments, the method can involve assigning, by the fleet management system, one or more vehicles of the one or more self-driving vehicles to at least one team. Each team can be identifiable by the team identifier. Each member of the team can be identifiable by the team member identifier.

In some embodiments, the method can involve the fleet management system identifying the one or more vehicles suitable for a mission.

In some embodiments, the method can involve the fleet management system assigning the one or more vehicles to the at least one team according to a user selection.

In some embodiments, the method can involve the fleet management system assigning the one or more vehicles to the at least one team based at least on a functionality of each vehicle of the one or more vehicles.

In another broad aspect, a communication system for self-driving vehicles is described. The communication system can include a communication network; one or more self-driving vehicles; and a fleet management system. Each self-driving vehicle can include a vehicle processor and a vehicle memory. The one or more self-driving vehicles are operable to communicate with each other via the communication network. The fleet management system can include a manager storage unit, a manager processor, and a manager communication interface. The manager storage unit can store operating data received from the one or more self-driving vehicles. The manager processor is operable to determine a characteristic of a set of vehicles of the one or more self-driving vehicles satisfies at least one communication condition; and in response to determining the set of vehicles satisfies the at least one communication condition, select a stored data portion from the manager storage unit based at least on the characteristic of the set of vehicles. The manager communication can interface to transmit the stored data portion to the set of vehicles via the communication network.

In another broad aspect, a method (and associated systems configured to implement the methods) of providing inter-vehicle communication between one or more self-driving vehicles is described. Each self-driving vehicle can include a vehicle processor and a vehicle memory. The method can involve: receiving, at a first vehicle of the one or more self-driving vehicles, an operating data portion related to at least one other vehicle of the one or more self-driving vehicles; determining from the received operating data portion, by the first vehicle, that a characteristic of the at least one other vehicle satisfies at least one communication condition; selecting a stored data portion from the vehicle memory of the first vehicle based on the characteristic of the at least one other vehicle; and initiating, by the first vehicle, a transmission of the stored data portion to the at least one other vehicle.

BRIEF DESCRIPTION OF THE DRAWINGS

Several embodiments will now be described in detail with reference to the drawings, in which.

Figure 1:
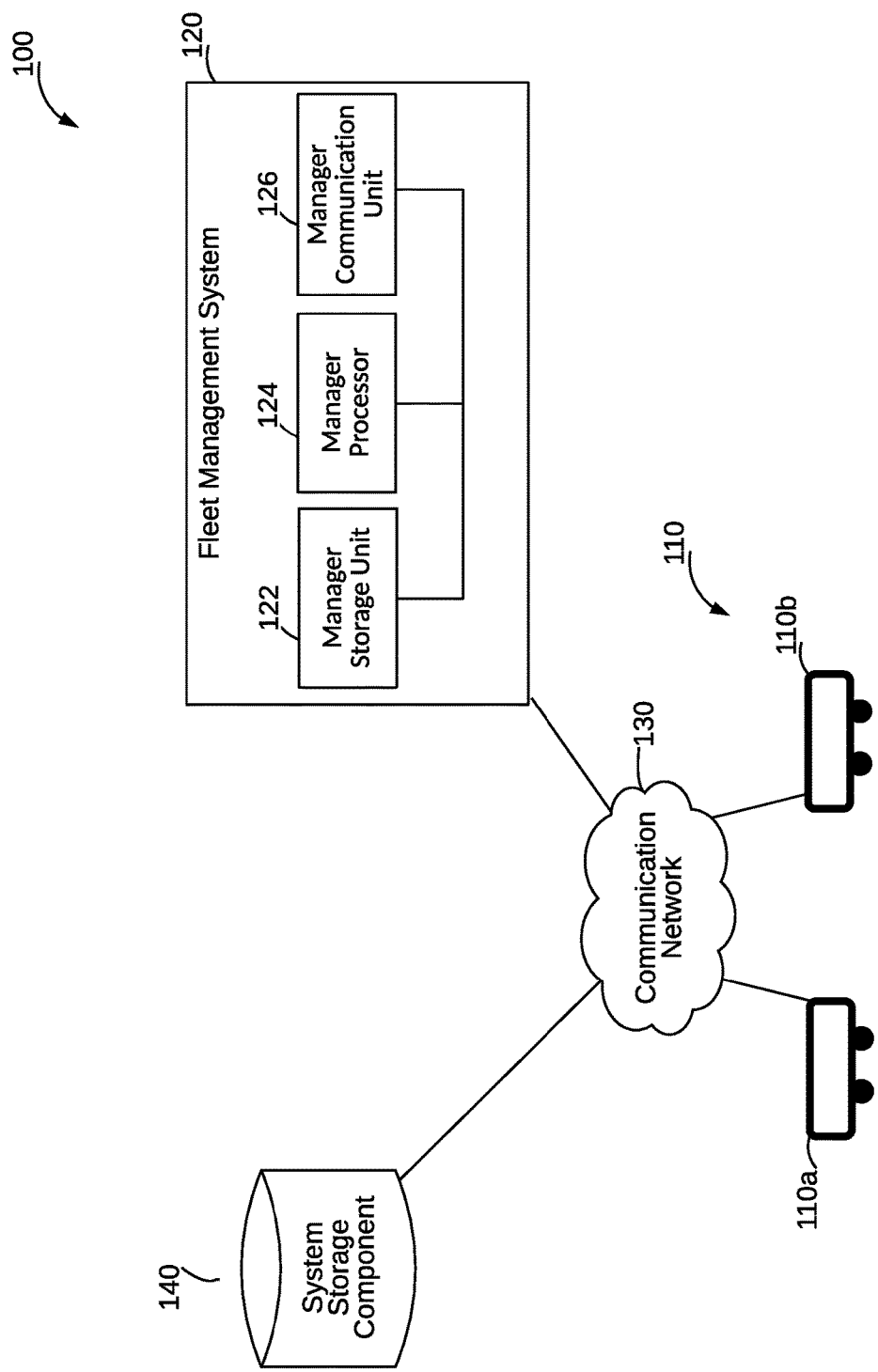
FIG. 1 is a diagram of a system of one or more self-driving vehicles, according to at least one embodiment.

The drawings, described below, are provided for purposes of illustration, and not of limitation, of the embodiments and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

A self-driving vehicle can plan its path to a destination location based at least on its current location and by referring to an electronic map of its environment. The self-driving vehicle can plan its path for conducting a mission or for collecting data from the environment, such as for the purpose of updating an electronic map of its environment. The self-driving vehicle can modify its planned path during its operation. The self-driving vehicle can, in some embodiments, modify its planned path based on data collected from its environment. For example, the self-driving vehicle can modify its planned path when it detects a collision will take place if it does not vary its planned path.

The self-driving vehicle can collect information in respect of its environment during its operation, such as while it is carrying out a mission. For example, a first self-driving vehicle can receive information from a second self-driving vehicle. The received information can include information collected by the second self-driving vehicle while it was carrying out a mission As data can be communicated between the self-driving vehicles as they are in motion, the information transmitted from the self-driving vehicles will likely be old by the time the information is received by another self-driving vehicle and/or the fleet management system. For example, at an initial time, a self-driving vehicle that is in motion can transmit its position and velocity data to another self-driving vehicle. Since the transmitting self-driving vehicle is in motion, the received position data is unlikely current and it is possible that the velocity data is no longer accurate. The self-driving vehicle that received the data can generate an estimated position of the transmitting self-driving vehicle at a subsequent time based at least on the received velocity data. The estimated position can, in some embodiments, take into account communication latency associated with the data transmission.

The type of information shared between the self-driving vehicles can vary. For example, a self-driving vehicle that is restricted to an area of a facility will be unlikely to require information about another self-driving vehicle operating outside that area. Some of the embodiments describe identifying characteristics of the self-driving vehicles to determine whether to share information between certain self-driving vehicles, and the type of information to be shared. As a result, data communication within the described systems can be, to an extent, minimized and/or delayed to avoid excessive strain on the communication resources.

Referring to FIG. 1, which shows an example communication system 100 involving one or more self-driving vehicles 110. The communication system 100 can include one or more self-driving vehicles 110, a fleet management system 120, a communication network 130, and a system storage component 140. Although only two self-driving vehicles 110a and 110b are shown in FIG. 1, it is possible for the communication system 100 to include fewer or more self-driving vehicles 110.

The fleet management system 120 can delegate missions to the self-driving vehicle 110. The missions can be determined by the fleet management system 120, or received at the fleet management system 120 as input data. As shown in FIG. 1, the fleet management system 120 includes a manager storage unit 122, a manager processor 124, and a manager communication interface 126.

The manager storage unit 122 can store data in respect of the operation of the communication system 100, such as data in respect of the self-driving vehicles 110 and the missions being carried out by the self-driving vehicles 110. For example, the manager storage unit 122 can store data received from the self-driving vehicles 110, data in respect of the missions delegated by the fleet management system 120, profile data in respect of each of the self-driving vehicles 110, an electronic map representing the environment in which the self-driving vehicles 110 are operating, etc. The manager storage unit 122 can also store computer programs that are executable by the manager processor 124 to facilitate communication between the fleet management system 120 and the self-driving vehicles 110.

In some embodiments, the manager storage unit 122 can store data that is more current based on the operation of the fleet management system 120, and the system storage component 140 can store data that is considered by the fleet management system 120 to unlikely be used in the immediate future. For example, the manager storage unit 122 can store operating data and vehicle profile data only for the self-driving vehicles 110 operating during a certain day, whereas the system storage component 140 can store the data for all self-driving vehicles 110 and the electronic map of the environment, which is typically infrequently changed.

In some embodiments, the manager storage unit 122 can instead be the system storage component 140, which is accessible via the communication network 130.

The manager processor 124 can control the operation of the fleet management system 120. The manager processor 124 may be any suitable processors, controllers or digital signal processors that can provide sufficient processing power depending on the configuration, purposes and requirements of the fleet management system 120. In some embodiments, the manager processor 124 can include more than one processor with each processor being configured to perform different dedicated tasks. The manager processor 124 together with the processor at the self-driving vehicles 110 contribute to the control of the communication system 100.

The manager communication interface 126 facilitates communication between the fleet management system 120 and the other components of the communication system 100, such as the self-driving vehicles 110 and the system storage component 140 via the communication network 130.

The self-driving vehicles 110 and the fleet management system 120 may communicate via the communication network 130.

The communication network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the fleet management system 120, the self-driving vehicles 110 and the system storage component 140.

For example, each self-driving vehicle 110 and the fleet management system 120 may be equipped with a wireless communication interface to enable wireless communications according to a Wi-Fi protocol (e.g. IEEE 802.11 protocol or similar). According to some embodiments, the communication network 130 may be a LAN, WWAN, and/or cellular network, for example, using a 3G/4G protocol.

Similar to the manager storage unit 122, the system storage component 140 can store information about the self-driving vehicles 110, including operating data, and electronic maps of the environment within which the self-driving vehicles 110 operate. Electronic maps can be stored in the system storage component 140 for subsequent retrieval by the self-driving vehicles 110. The self-driving vehicles 110 can download electronic maps from the system storage component 140 via the communication network 130, for example.

Electronic maps can be generated for the environment of the self-driving vehicles 110. For example, a CAD file representing the environment of the self-driving vehicles 110 can be imported and form the basis for an electronic map. In another example, the fleet management system 120 can generate the electronic map based on data collected by the self-driving vehicle 110.

In some embodiments, operating data can be stored in the system storage component 140, and the operating data can be retrieved by the fleet management system 120 when needed. The fleet management system 120 can download the operating data from the system storage component 140 via the communication network 130. Example operating data can include, but not limited to, a current position of the self-driving vehicle 110, a current velocity of the self-driving vehicle 110, an estimated position for the self-driving vehicle 110 at a subsequent time, an estimated completion time of a current mission of the self-driving vehicle 110, and an estimated remaining battery lifetime of the self-driving vehicle 110. In some embodiments, the operating data, or at least some of the operating data, can be stored in the manager storage unit 122. In some embodiments, the fleet-management system 120 and/or any or all of the individual the manager storage unit 122, the manager processor 124, the manager communication unit 126, can reside on one or more of the self-driving vehicles 110.

Figure 2:
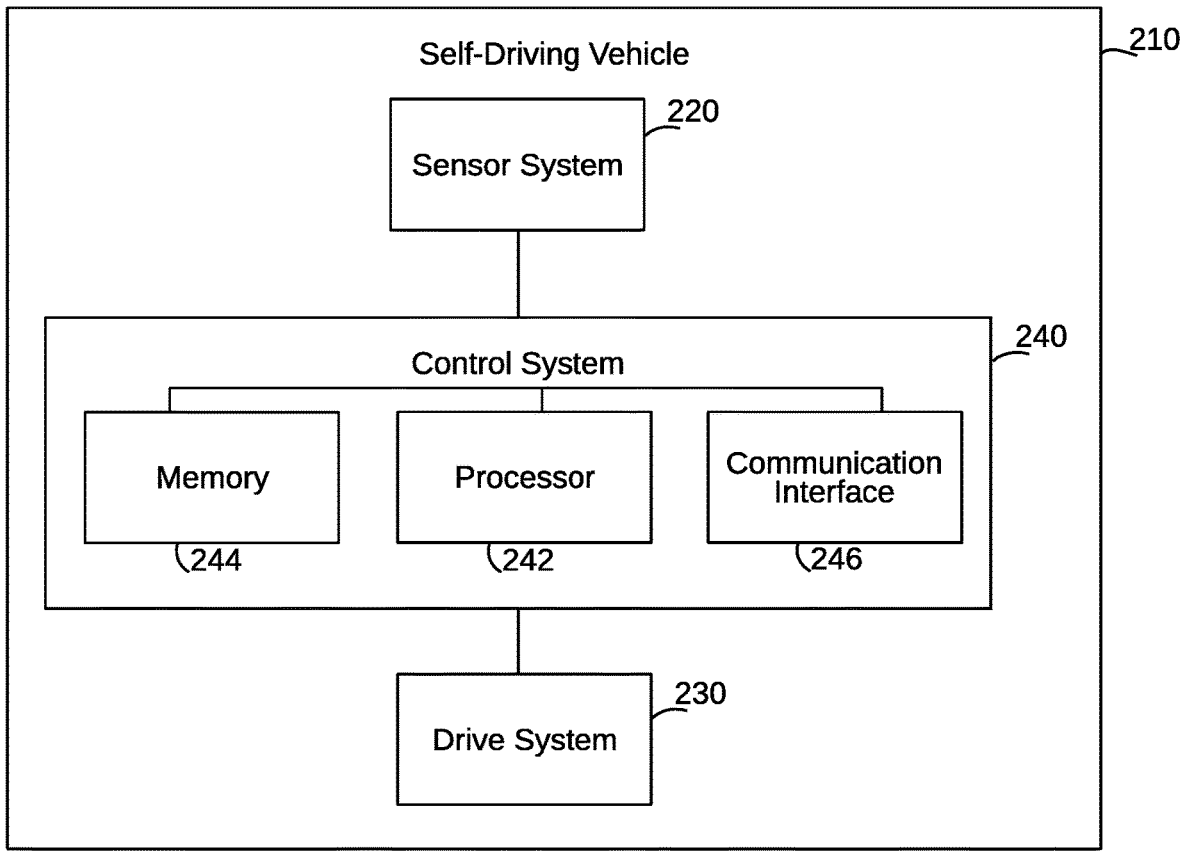
FIG. 2 is a block diagram of a self-driving vehicle, according to at least one embodiment.

Referring now to FIG. 2, which shows a block diagram of an example self-driving vehicle 210. The self-driving vehicle 210 includes a sensor system 220, a control system 240 and a drive system 230.

The sensor system 220 can include one or more sensors for collecting data from the environment of the self-driving vehicle 110. For example, the sensor system 220 can include a LiDAR device (or other optical, sonar, or radar-based range-finding devices operating on known principles such as time-of-flight). The sensor system 220 can include optical sensors, such as video cameras and systems (e.g., stereo vision, structured light).

The control system 240 can include a processor 242, a memory (or storage unit) 244, and a communication interface 246. The control system 240 facilitates the operation of the self-driving vehicle 110. The control system 240 can store an electronic map that represents the environment of the self-driving vehicle 110, such as a facility, in the memory 244.

The processor 242 can include any suitable processors, controllers or digital signal processors that can provide sufficient processing power depending on the configuration, purposes and requirements of the self-driving vehicle 110. In some embodiments, the processor 242 can include more than one processor with each processor being configured to perform different dedicated tasks.

The memory 244 can store data to be used during the operation of the self-driving vehicle 110 and/or to facilitate the operation of the self-driving vehicle 110. Example data can include operating data in respect of its operation, the electronic map representing its environment, data in respect of one or more other self-driving vehicles 110, data in respect of its mission, etc.

In some embodiments, the memory 244 can store software applications executable by the processor 242. For example, the software application includes image processing applications that facilitate image data collection by the self-driving vehicle 110.

The communication interface 246 can include any component for facilitating communication with the other components of the communication system 100 via the communication network 130. For example, the communication interface 246 can include a wireless transceiver for communicating within a wireless communications network.

The self-driving vehicle 110 can receive a mission from the fleet management system 120 or an external system. The mission received from the fleet management system 120 can include one or more waypoints or destination locations. Based on the received mission, the control system 240 can determine a path for the self-driving vehicle 110 to navigate to the waypoint or destination location with minimal, if any, instructions from another system or the users. The control system 240 and the sensor system 220 can navigate the self-driving vehicle 110 without any additional navigational aids (e.g., navigational targets, magnetic strips, or paint/tape traces) installed in the environment.

For example, the control system 240 can generate a path for the self-driving vehicle 110 to a destination location based on the location of the self-driving vehicle 110. The control system 240 can then operate the drive system 230 to direct the self-driving vehicle 110 along the planned path. As the self-driving vehicle 110 travels along the planned path, the sensor system 220 can collect data from the environment. The collected data can assist the control system 240 to track the progress of the self-driving vehicle 110 along the planned path and also to update a location of the self-driving vehicle 110 within the environment. Example data collected by the sensor system 220 can include images of the environment.

At least with the data collected by the sensor system 220, the control system 240 can determine when an unexpected obstacle is in the planned path, and modify the planned path to navigate around the obstacle.

In some embodiments, the self-driving vehicle 110 can be equipped with one or more end effectors for facilitating interaction with objects within the environment. Example end effectors can include a gripper, a clamp, a shovel, a broom, a vacuum, a rotating spindle, or any other tools. The operation of the end effectors can be controlled by the control system 240 and, in some embodiments, with consideration of the data collected by the sensor system 220.

The self-driving vehicle 110 can operate in environments with varied terrains and/or regulated zones that require environmental qualifications. Example regulated zones can include sterile environments, and temperature-controlled environments (e.g., high or low temperature environments). The self-driving vehicle 110 can be configured to comply with the requirements of the various terrains and/or zones within its environment. For example, a self-driving vehicle 110 can be sterilized to operate in a sterile environment and subsequently only operate within the boundaries of the sterile environment in order to maintain its qualification. Self-driving vehicles 110 may undergo environmental testing or include higher rated components to meet other environmental qualifications.

Figure 3:
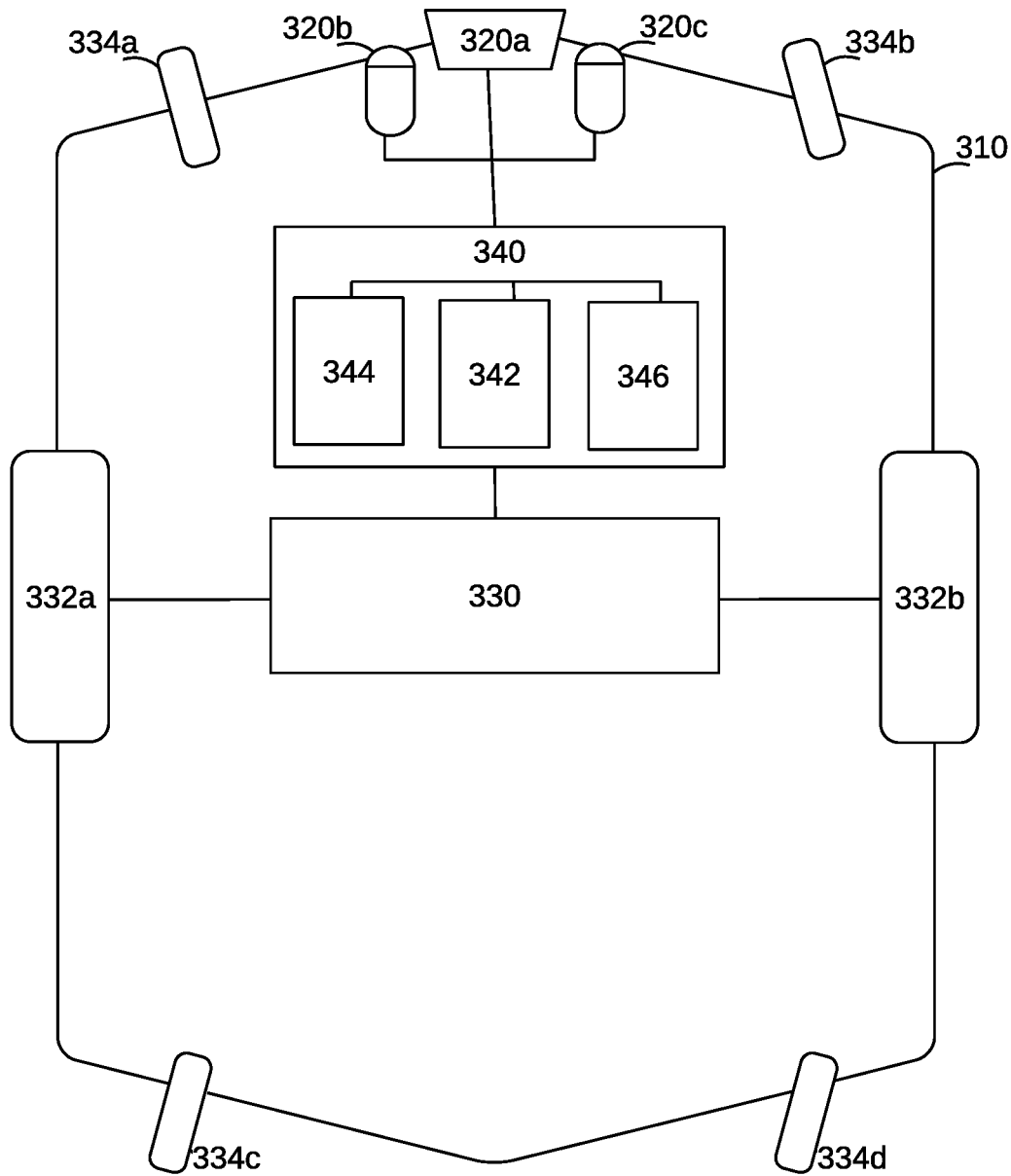
FIG. 3 is a block diagram of an example self-driving transport vehicle, according to at least one embodiment.

FIG. 3 shows a block diagram of another example self-driving vehicle 310.

The self-driving vehicle 310 shown in FIG. 3 can act as a self-driving transport vehicle 310 for transporting objects between different locations. The self-driving transport vehicle 310 can include a cargo component for carrying loads. For example, the cargo component can be a flatbed or a bucket having sidewalls to prevent loads from falling out as the self-driving transport vehicle 310 moves. The self-driving transport vehicle 310 can include cargo securing mechanisms to secure the load and prevent the load from falling off the self-driving transport vehicle 310. Although the self-driving vehicle 310 can act as a self-driving transport vehicle, the self-driving vehicle 310 is not limited to transporting objects.

Similar to the self-driving vehicle 210 of FIG. 2, the self-driving vehicle 310 includes a drive system 330, a sensor system 320 and a control system 340.

The drive system 330 includes a motor and/or brakes connected to drive wheels 332a and 332b for driving the self-driving transport vehicle 310. The motor can be, but is not limited to, an electric motor, a combustion engine, or a combination/hybrid thereof. Depending on the application of the self-driving vehicle 310, the drive system 330 may also include control interfaces that can be used for controlling the drive system 330. For example, the drive system 330 may be controlled to drive the drive wheel 332a at a different speed than the drive wheel 332b in order to turn the self-driving transport vehicle 310. Different embodiments may use different numbers of drive wheels, such as two, three, four, etc.

A number of wheels 334 may be included. The self-driving vehicle 310 includes wheels 334a, 334b, 334c, and 334d. The wheels 234 may be wheels that are capable of allowing the self-driving transport vehicle 310 to turn, such as castors, omni-directional wheels, and mecanum wheels. In some embodiments, the self-driving transport vehicle 310 can be equipped with special tires for rugged surfaces or particular floor surfaces unique to its environment.

The sensor system 320 in FIG. 3 includes example sensors 220a, 220b, and 220c. The sensors 220a, 220b, 220c can optical sensors arranged to provide three-dimensional (e.g. binocular or RGB-D) imaging.

The positions of the components 334, 320, 340, 330, 332 of the self-driving transport vehicle 310 are shown for illustrative purposes and are not limited to the illustrated positions. Other configurations of the components 334, 320, 340, 330, 332 can be used depending on the application of the self-driving transport vehicle 310 and/or the environment in which the self-driving transport vehicle 310 will be used.

Figure 4:
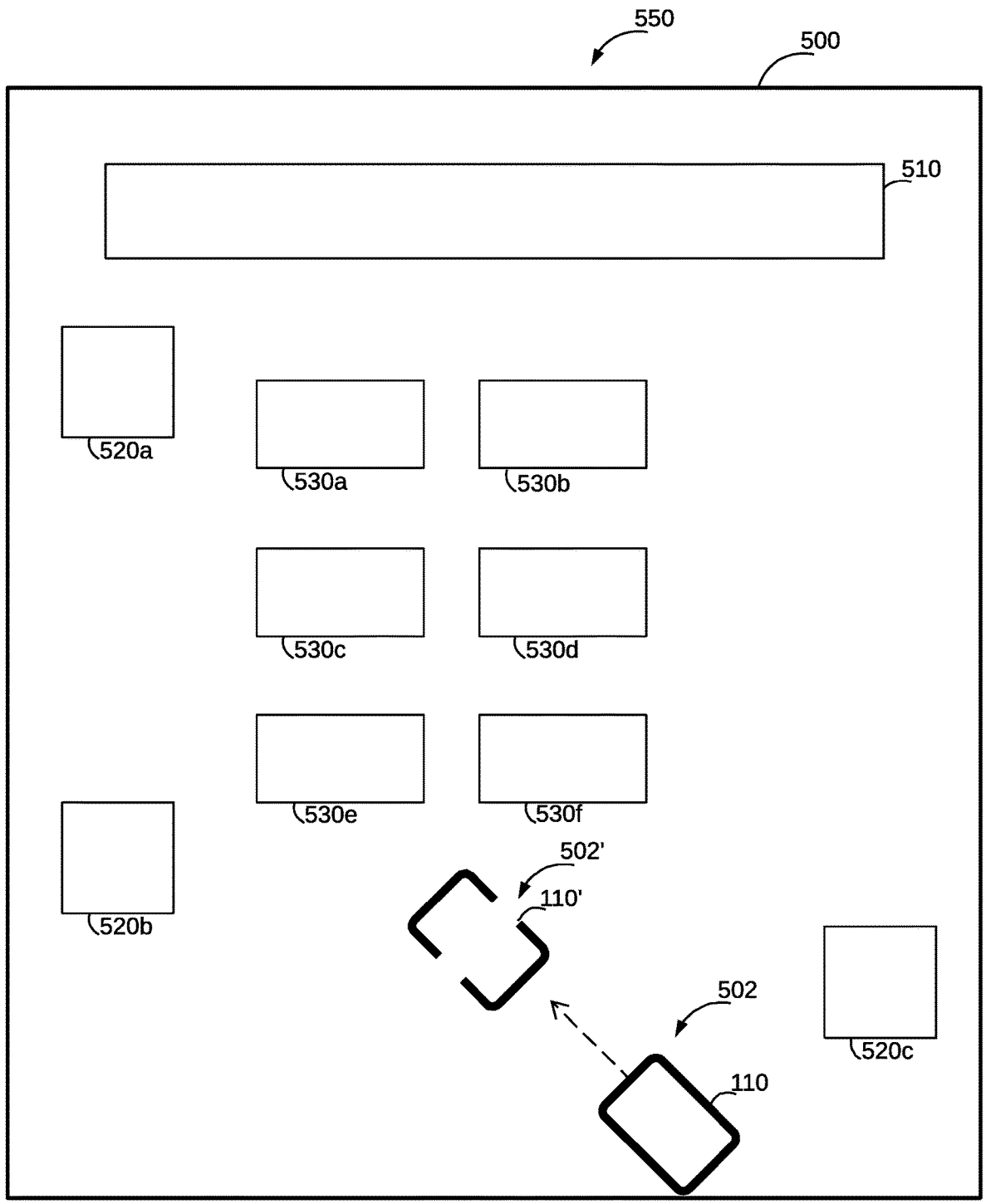
FIG. 4 is a diagram of a self-driving vehicle located at an initial position and a subsequent position within an example facility, according to at least one embodiment.

For illustrating some embodiments of the described methods and systems, reference will now be made to FIG. 4. FIG. 4 is a diagram 550 of an example self-driving vehicle 110 operating in a facility with an example layout 500. The facility can include any environment with a defined boundary and used for a particular purpose. For example, facilities can include, but are not limited to, manufacturing plants, warehouses, offices, hospitals, hotels, and restaurants.

In general, the self-driving vehicle 110 may travel between various points within the facility. The self-driving vehicle 110 can act as a transport vehicle for delivering and retrieving items, can act as a monitoring vehicle for the facility, and/or can act as a data collecting vehicle. In a manufacturing plant facility, the self-driving vehicle 110 can retrieve components from the storage shelves and deliver those components to the appropriate point within an assembly line or staging station.

As shown in FIG. 4, the layout 500 of the facility has a number of features that the self-driving vehicle 110 needs to navigate. Example features include shelf 510, staging stations 520a, 520b, and 520c, and pallets 530a, 530b, 530c, 530d, 530e and 530f. Some of the features, such as the shelf 510 and the staging stations 520a, 520b and 520c, are permanent objects, whereas other features, such as the pallets 530 are temporary or transient objects. Other example permanent objects can include a wall or pillars. Other example temporary objects include, but are not limited to, carts, crates, machineries, and bins. During its operation, the self-driving vehicle 110 needs to navigate around these obstacles in order to carry out its mission. Unlike the permanent objects, which are unlikely to move, the temporary objects can be a challenge to the navigation of the self-driving vehicle 110.

In FIG. 4, the self-driving vehicle 110 is located generally at an initial position 502 within the layout 500. A position can be represented by a coordinate within the electronic map of the facility and a heading within the coordinate system of the electronic map. For example, if an electronic map uses an x-y coordinate system, the position can be defined by coordinates in terms of x and y, and a heading in the x-y plane. The initial position 502 can represent the position of the self-driving vehicle 110 at the time that a communication session takes place. The communication session can include any transmission of data from the self-driving vehicle 110 to another self-driving vehicle 110 and/or the fleet management system 120.

If the self-driving vehicle 110 is in motion at the initial position 502, the self-driving vehicle 110 can be travelling at an initial velocity. Velocity can be represented by a speed of the self-driving vehicle 110 and a heading with respect to the coordinate system of the electronic map, similar to the position of the self-driving vehicle 110. As shown in FIG. 4, after a period of time, the self-driving vehicle 110 will have travelled at the initial velocity to a subsequent position 502'.

It should be noted that the heading associated with the position 502, 502' of the self-driving vehicle 110 can be different from the heading associated with the velocity of the self-driving vehicle. In some embodiments, a speed of the self-driving vehicle 110 can be limited to a range appropriate for its environment.

Figure 5:
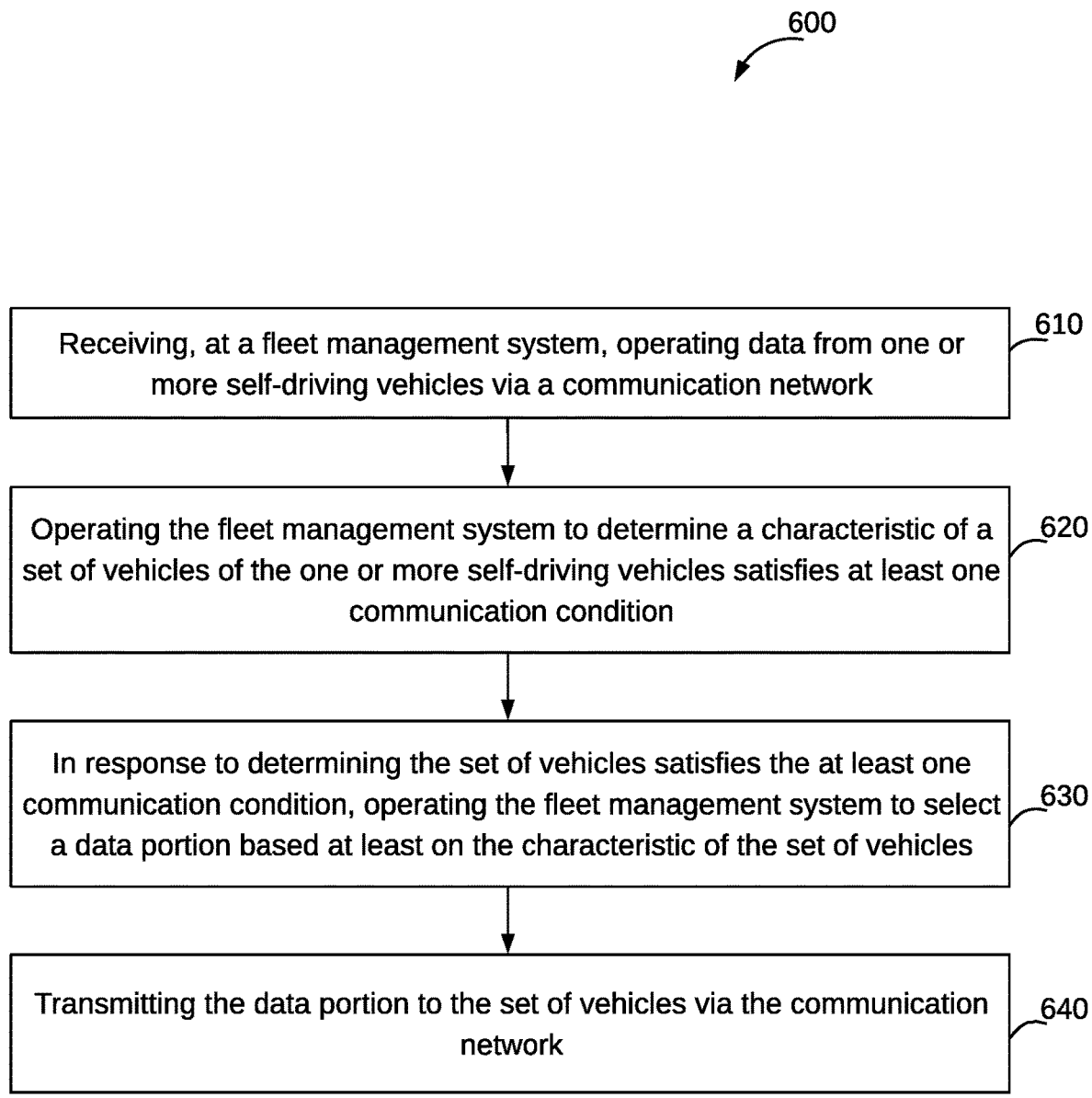
FIG. 5 is an example method of providing a communication system for self-driving vehicles, according to at least one embodiment.

FIG. 5 shows an example method 600 of providing a communication system for self-driving vehicles 110.

At 610, the fleet management system 120 can receive operating data from one or more self-driving vehicles 110, via the communication network 130.

When the operating data is received by the fleet management system 120, the self-driving vehicle 110 can be carrying out a mission, or awaiting a mission to be delegated from the fleet management system 120.

In the communication system 100 disclosed herein, the self-driving vehicles 110 can determine when to transmit its operating data to the fleet management system 120, as well as the type of operating data to be transmitted. By controlling the data transmission, use of the communication resources within the environment can be minimized. For example, the self-driving vehicle 110 can be scheduled to transmit its operating data to the fleet management system 120 during known off-peak periods.

In at some embodiments, the self-driving vehicle 110 can transmit its operating data to the fleet management system 120 in response to a triggering event. For example, the triggering event can be pre-determined time intervals, completion of a mission and/or a position of the self-driving vehicle 110.

Figure 6:
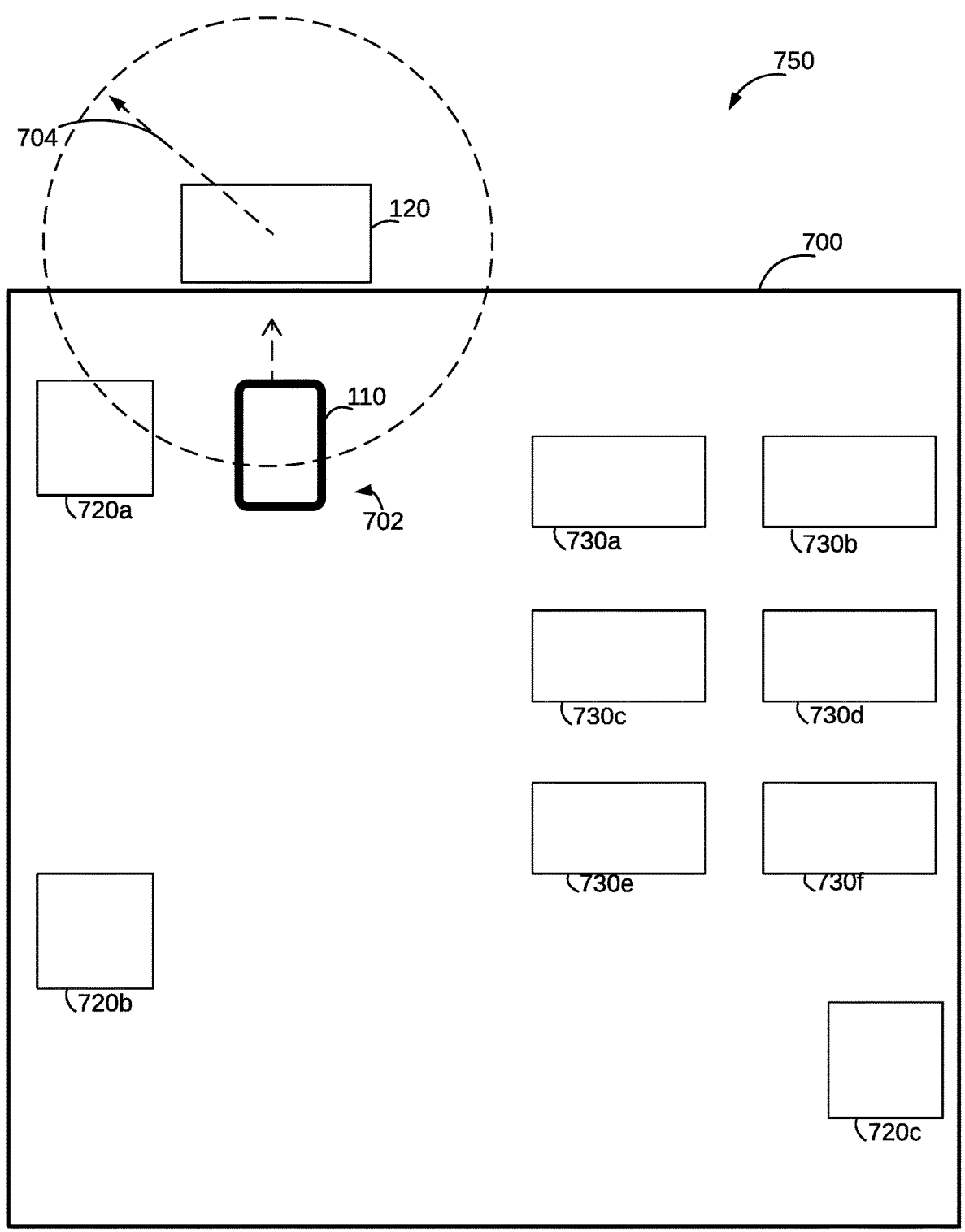
FIG. 6 is a diagram of a self-driving vehicle operating within an example facility having a fleet management system, according to at least one embodiment.

For example, the self-driving vehicle 110 can determine whether it is at a position within the facility that is within a proximity threshold of the fleet management system 120. FIG. 6 shows an example diagram 750 in which the self-driving vehicle 110 is within the proximity threshold 704 of the fleet management system 120.

FIG. 6 shows the self-driving vehicle 110 at a position 702. The layout 700 of the facility includes staging stations 720a, 720b, and 720c, and pallets 730a, 730b, 730c, 730d, 730e, and 730f. In FIG. 6, the fleet management system 120 is shown to be positioned outside of the layout 700 of the facility. The fleet management system 120 may not be outside the facility but is just not included in the electronic map generated for the facility.

When the self-driving vehicle 110 is within the proximity threshold 704 of the fleet management system 120, as shown in FIG. 6, the self-driving vehicle 110 can then initiate a communication session for transmitting its operating data to the fleet management system 120. The proximity threshold 704 can be defined by a distance between two points (e.g., the fleet management system 120 and the self-driving vehicle), or a radius from a substantially central position of the fleet management system 120. In some embodiments, the proximity threshold 704 can be defined by a signal strength for the communication session.

In some embodiments, one or more different levels of proximity thresholds can trigger the self-driving vehicle 110 to transmit operating data to the fleet management system 120. For example, a first proximity threshold can be at 300 meters away from the fleet management system 120 and a second proximity threshold can be at 100 meters away from the fleet management system 120. The operating data transmitted at the different proximity thresholds can vary in priority as determined by the self-driving vehicle 110. For example, higher priority data can be transmitted at the first proximity threshold (e.g., when the self-driving is farther away from the fleet management system 120) and lower priority data can be transmitted at the second proximity threshold.

In some embodiments, the triggering event can be the type of operating data collected at the self-driving vehicle 110. For example, the self-driving vehicle 110 can analyze the operating data to determine a critical transmission period for transmission. The self-driving vehicle 110 can then transmit the operating data to before or during the critical transmission period.

A critical transmission period can be more imminent for operating data that is necessary for the operation of other self-driving vehicles 110 and/or the operations at the fleet management system 120. For example, a substantial change to the layout 500 of the environment can be associated with a critical transmission period with a high priority.

Other high priority operating data can include data indicating a failure or a potential failure by the self-driving vehicle 110 to completing its mission. For example, the operating data can include an estimated battery lifetime that indicates the self-driving vehicle 110 will not be able to complete the mission due to an unforeseen use of its battery, such as maneuvering around an unexpected obstacle within the environment. The estimated battery lifetime of the self-driving vehicle 110 can relate to on-board energy storage of the self-driving vehicle 110, such as batteries, ultracapacitors, fuel cells, propane, or gasoline. When the self-driving vehicle 110 detects that the estimated battery lifetime will be insufficient, the self-driving vehicle 110 can assign a critical transmission period that is more imminent so that the self-driving vehicle 110 can transmit the estimated battery lifetime to the fleet management system 120 as soon as possible so that the fleet management system 120 can assign another self-driving vehicle 110 to complete the mission.

Lower priority operating data can include a progress of the self-driving vehicle 110, such as an estimated mission completion time.

The various triggers for the self-driving vehicle 110 are not mutually exclusive. For example, the self-driving vehicle 110 can transmit operating data to the fleet management system 120 at pre-determined time intervals and also at the completion of a mission.

At 620, the fleet management system 120 can determine that a characteristic of a set of self-driving vehicles 110 satisfies at least one communication condition. The set of self-driving vehicles 110 can include one or more self-driving vehicles 110.

The fleet management system 120 can evaluate one or more communication conditions for determining whether to transmit a data portion to the identified set of self-driving vehicles 110. For example, a communication condition can relate to a vehicular proximity threshold, an environment proximity threshold, a functionality requirement, and a team identifier.

Figure 7:
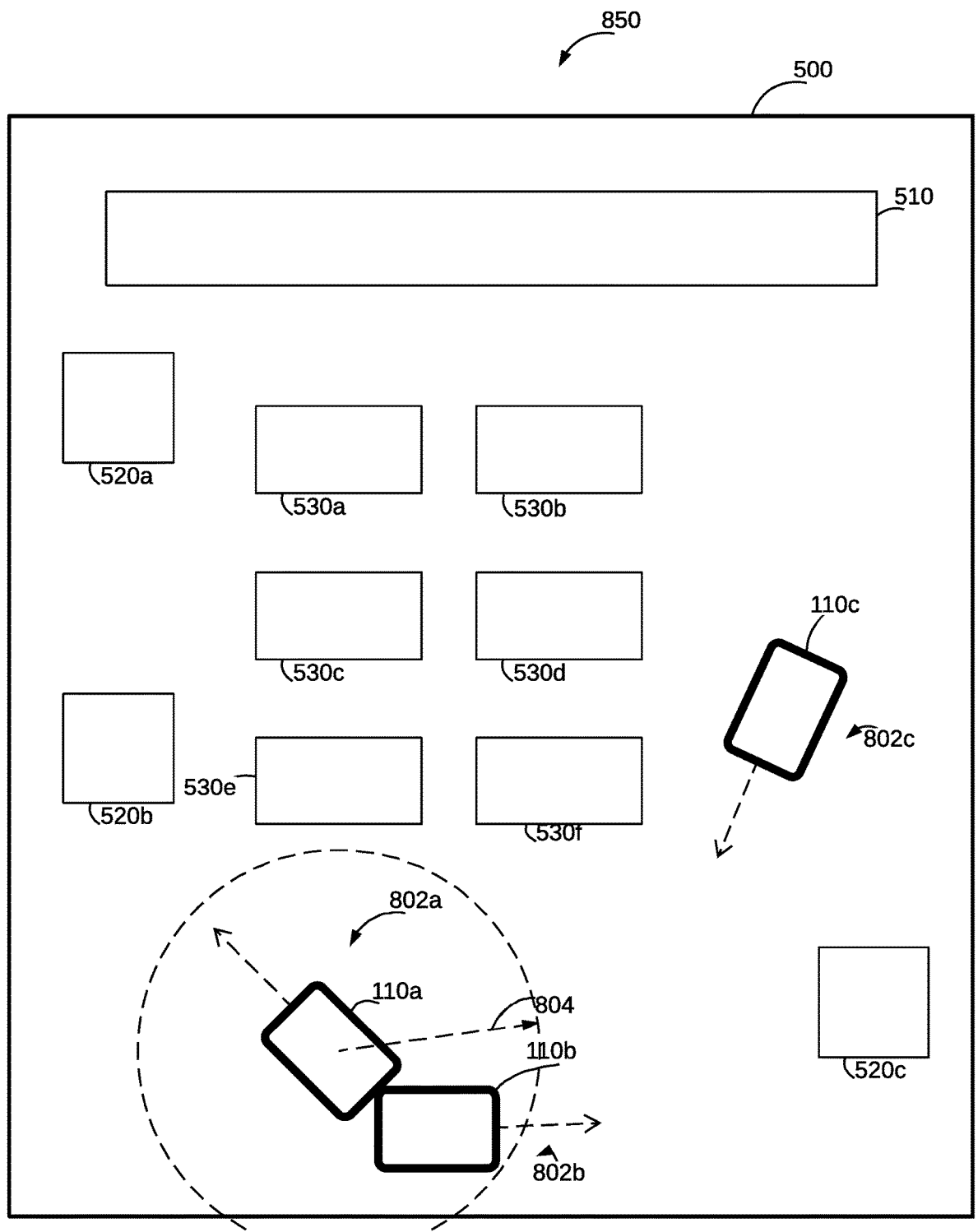
FIG. 7 is a diagram of three self-driving vehicles operating in the example facility shown in FIG. 4, according to at least one embodiment.

A vehicular proximity threshold relates to a distance between two self-driving vehicles 110. Reference will now be made to FIG. 7.

FIG. 7 shows the layout 500 of FIG. 4 with three self-driving vehicles 110*a*, 110*b*, and 110*c* operating therein. In this illustrated embodiment, self-driving vehicles 110*a*, 110*b*, and 110*c* are at respective positions 802*a*, 802*b*, and 802*c*.

An example vehicular proximity threshold 804 for the self-driving vehicle 110*a* is shown. The illustrated vehicular proximity threshold 804 is a radius defined from a substantially central position of the self-driving vehicle 110*a*. The vehicular proximity threshold 804 generally corresponds to a distance between two points (e.g., two self-driving vehicles 110) and can be represented by a radius defined from a point at the relevant self-driving vehicle 110.

Each self-driving vehicle 110*a*, 110*b*, 110*c* can be assigned a different vehicular proximity threshold 804. The vehicular proximity threshold 804 assigned to each self-driving vehicle 110*a*, 110*b*, 110*c* can vary with various parameters, such as a profile of the self-driving vehicle 110 (e.g., dimensions) and peripherals available at the self-driving vehicle 110 (e.g., range of sensors and end effectors, etc.).

In some embodiments, the vehicular proximity threshold 804 can have a dynamic value. For example, the vehicular proximity threshold 804 can vary with a speed of the self-driving vehicle 110. The vehicular proximity threshold 804 can be a smaller value when the self-driving vehicle 110 is travelling at a lower speed and a larger value when the self-driving vehicle 110 is travelling at a higher speed. The vehicular proximity threshold 804 can also vary if the fleet management system 120 determines that a self-driving vehicle 110 is in a crowded area. The fleet management system 120 can then adjust the vehicular proximity threshold 804 accordingly.

In some embodiments, the vehicular proximity threshold 804 can be defined based on time. For example, a vehicle proximity threshold 804 can be a maximum of five minutes. The fleet management system 120 can determine that the self-driving vehicle 110*a* is travelling at a first velocity and the self-driving vehicle 110*b* is travelling at a second velocity. Based on their first and second velocities of the respective self-driving vehicles 110*a*, 110*b*, the self-driving vehicles 110*a*, 110*b* are four minutes away from each other. The fleet management system 120, therefore, can determine that the self-driving vehicles 110*a* and 110*b* satisfy the vehicle proximity threshold 804.

As shown in FIG. 7, the self-driving vehicle 110*b* at position 402*b* is located within the vehicular proximity threshold 804 of the self-driving vehicle 110*a*. The fleet management system 120 can determined that the self-driving vehicle 110*b* satisfies the vehicular proximity threshold 804 of the self-driving vehicle 110*a*. As also shown in FIG. 7, the self-driving vehicle 110*c* is currently at position 802*c*, which is outside the vehicular proximity threshold 804 of the self-driving vehicle 110*a*. The fleet management system 120 can determine that the position 802*c* of the self-driving vehicle c does not satisfy the vehicular proximity threshold 804 of the self-driving vehicle 110*a*. The fleet management system 120, therefore, will not include the self-driving vehicle 110*c* into the set of self-driving vehicles.

At 630, the fleet management system 120, in response to determining the set of self-driving vehicles 110 satisfies the at least one communication condition, the fleet management system 120 can select a stored data portion based at least on the characteristic of the set of self-driving vehicles 110. The fleet management system 120 can select the data portion from the manager storage unit 122 and/or the system storage component 140, depending on the type of data being requested and the type of data being stored in the respective storage elements.

Returning to the example shown in FIG. 7, when the fleet management system 120 determines that the set of self-driving vehicles 110*a* and 110*b* are within the vehicular proximity threshold 804, the fleet management system 120 can determine the data that should be transmitting to the set of self-driving vehicles 110*a*, 110*b*. For example, after determining the self-driving vehicles 110a, 110b satisfy the vehicular proximity threshold 804, the fleet management system 120 can select a stored data portion based at least on the positions 802a and 802b of the respective self-driving vehicles 110a and 110b. The data portion selected based on the positions 802a, 802b can include the position data itself (e.g., coordinates and heading), data related to the planned path of the self-driving vehicles 110a and 110b, data related to the velocity of the self-driving vehicles 110a, 110b, data related to the missions being carried out by the self-driving vehicles 110a, 110b, and other related data.

At 640, the fleet management system 120 can transmit the data portion to the set of self-driving vehicles 110a, 110b via the communication network 130.

Continuing with the example shown in FIG. 7, after selecting the stored data portion, the fleet management system 120 can transmit the stored data portion to the self-driving vehicles 110a and 110b via the communication network 130.

Figure 8:
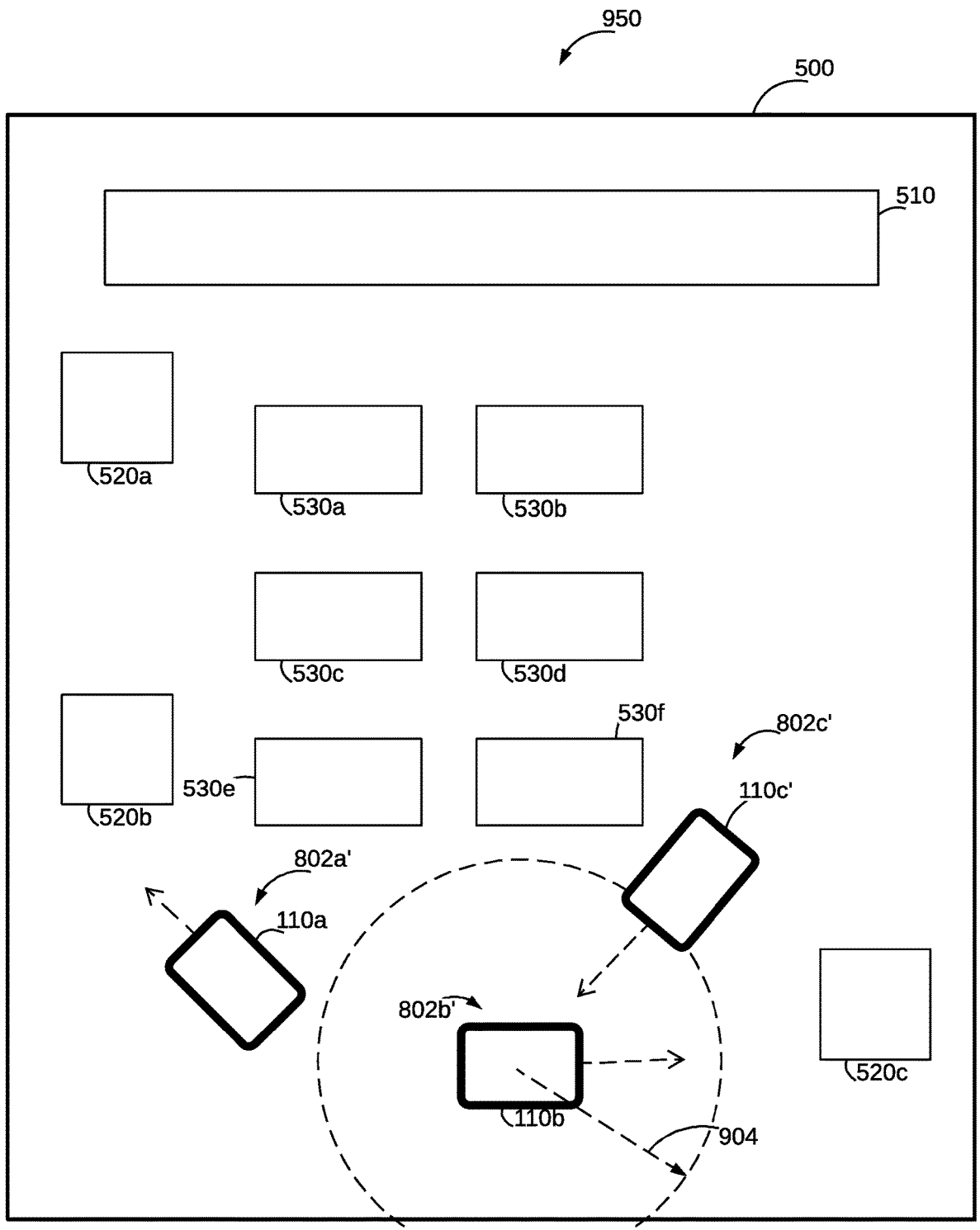
FIG. 8 is a diagram of two self-driving vehicles operating in the example facility shown in FIG. 4, according to at least one embodiment.

Referring now to FIG. 8, which shows the layout 500 of FIG. 7 at a subsequent time. As shown in FIG. 8, the self-driving vehicles 110a, 110b, 110c are at respective positions 802a', 802b', 802c'. In this example, the vehicular proximity threshold 904 for the self-driving vehicle 110b is shown. The self-driving vehicle 110c is currently not within the vehicular proximity threshold 904 of the self-driving vehicle 110b. However, the fleet management system 120 can estimate, based on the velocities of the self-driving vehicles 110b and 110c and the positions 802b', 802c' of the respective self-driving vehicles 110b and 110c, that the self-driving vehicle 110c will soon be within the vehicular proximity threshold 904 at a subsequent time. In some embodiments, the fleet management system 120 can determine the estimated positions of the planned path of the self-driving vehicles 110. For example, the planned path can include future positions (e.g., coordinates and heading) of the self-driving vehicle 110.

Based at least on the estimated position for the self-driving vehicle 110c at the subsequent time, the fleet management system 120 can determine that the self-driving vehicle 110c will satisfy the vehicular proximity threshold 904 of the self-driving vehicle 110b and select a stored data portion based on the estimated positions of the self-driving vehicles 110b and 110c. The selected data portion can relate to the estimated positions of the self-driving vehicles 110b and 110c and the velocity of the self-driving vehicles 110b, 110c at the initial time, for example.

Another communication condition can include an environment proximity threshold. The environment proximity threshold can be defined between a self-driving vehicle 110 and one or more features of the environment of the self-driving vehicle 110. The features of the environment can include the permanent and temporary objects, a charging station, the fleet management system 120, and area with a reduced or enhanced network access.

Figure 9:
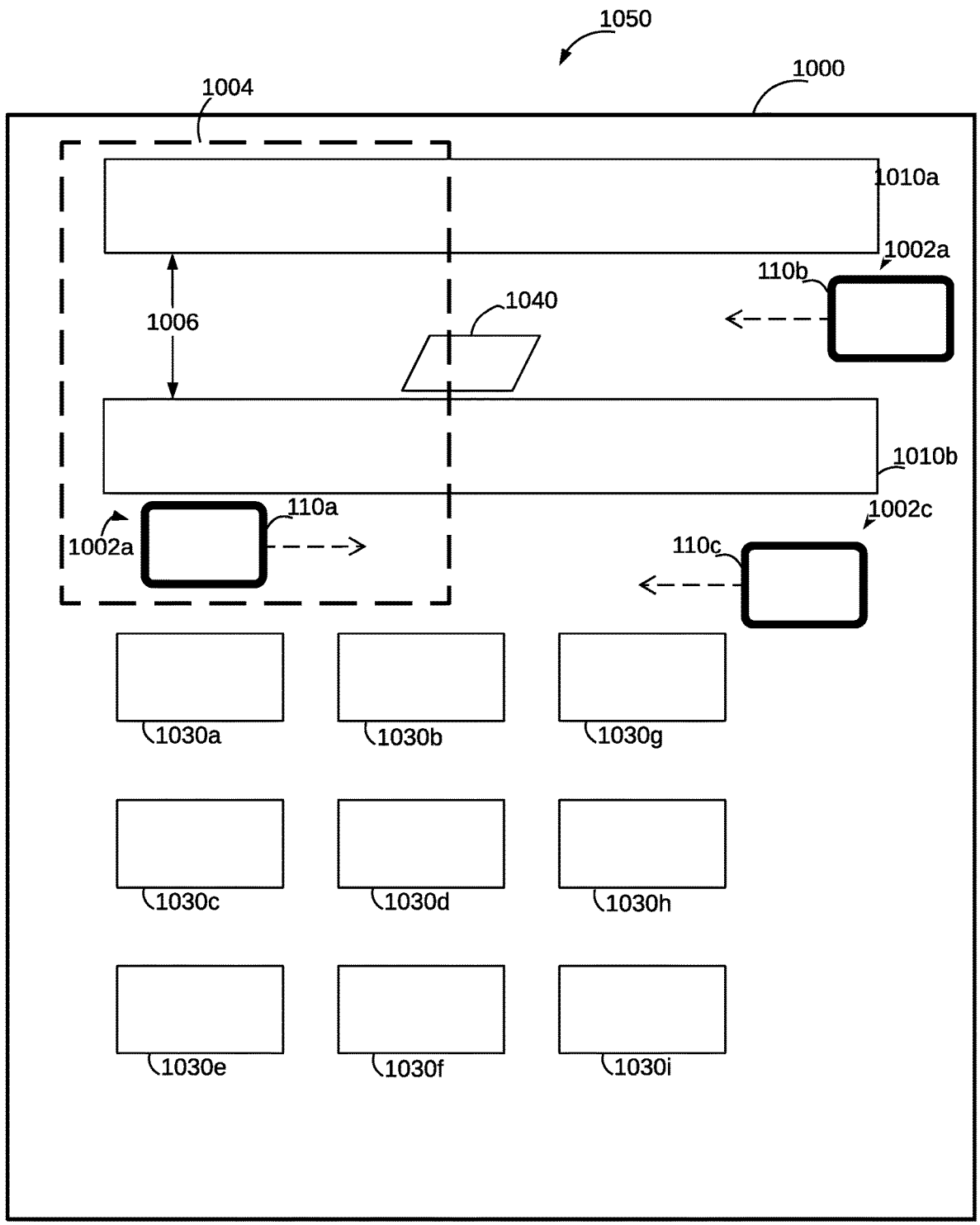
FIG. 9 is a diagram of three self-driving vehicles operating within an example facility, according to at least one embodiment.

FIG. 9 shows a diagram 1050 of an example layout 1000 of a facility. In the layout 1000, self-driving vehicles 110a, 110b, and 110c are located at respective positions 1002a, 1002b, and 1002c. The layout 1000, as shown, includes shelves 1010a and 1010b, pallets 1030a, 1030b, 1030c, 1030d, 1030e, 1030f, 1030g, 1030h and 1030i, and a machine 1040.

An aisle 1006 is formed between the shelves 1010a and 1010b. The machine 1040 is currently operating in the aisle 1006. The machine 1040 is a temporary object and so, it is possible that its presence in the aisle 1006 was not registered into the electronic map stored at the self-driving vehicle 110b. The self-driving vehicle 110b's mission requires the self-driving vehicle 110b to travel to the region 1008 of the shelf 1010a. However, the self-driving vehicle 110b cannot reach the region 1008 due to the unexpected obstacle (the machine 1040).

The fleet management system 120 can then determine whether another self-driving vehicle 110 is near the opposite end of the aisle 1006 to assist with completing the mission of the self-driving vehicle 110b. As shown in FIG. 9, a general region 1004 is identified near the opposite end of the aisle 1006. The region 1004 can represent the environment proximity threshold, which can correspond to a distance surrounding one of the features of the environment. Similar to the proximity threshold 704 and the vehicular proximity threshold 804, 904, the environment proximity threshold 1004 can be defined by a radius from a substantially central position of a feature of the environment. In some embodiments, the environment proximity threshold 1004 can be defined by a time period—such as a maximum travel time for a self-driving vehicle 110 to reach the feature.

In the example shown in FIG. 9, the fleet management system 120 can determine that the self-driving vehicle 110a is within the environment proximity threshold 1004 and can assist with the completion of the mission of the self-driving vehicle 110b. The fleet management system 120 can also determine that although the self-driving vehicle 110c is near the self-driving vehicle 110b, the self-driving vehicle 110c is not within the environment proximity threshold 1004. The fleet management system 120 can then select a data portion to be transmitted to the self-driving vehicle 110a. For example, the fleet management system 120 can select the data portion associated with the positions 1002a and 1002b, the velocities of the self-driving vehicles 110a, 110b, and information in respect of the current mission of the self-driving vehicles 110a and 110b. Other data that may be relevant to the operation of the self-driving vehicles 110a, 110b can also be selected by the fleet management system 120.

Another example environment proximity threshold 1004 can be in respect of a charging station located within an environment of the self-driving vehicles 110 and the fleet management system 120.

For example, when the fleet management system 120 determines that the self-driving vehicle 110 is within the environment proximity threshold 1004 defined with respect to the fleet management system 120, the fleet management system 120 trigger the self-driving vehicle 110 to transmit operating data to the fleet management system 120.

Another feature of the environment relates to an area with a reduced or enhanced network access. Depending on the strength of the network access at the position of the self-driving vehicle 110, the fleet management system 120 can trigger a transmission of data to the self-driving vehicle 110. It is common for there to be varied signal strength throughout a facility, or for certain areas to be more likely to cause signal interference due to the presence of certain equipment.

For each region associated with a varied network access, an environment proximity threshold can be defined. For example, for a region with a reduced network access, the fleet management system 120 can define an environment proximity threshold that requires the self-driving vehicle 110 to be farther away from that region before a communication session is established between the self-driving vehicle 110 and the fleet management system 120. For this region, the fleet management system 120 can limit the data being transmitted to that self-driving vehicle 110 to high priority information.

In contrast, for a region with enhanced network access, the fleet management system 120 can define an environment proximity threshold that can trigger a communication session between the self-driving vehicle 110 and the fleet management system 120 even when the self-driving vehicle 110 is located at a significant distance from that region. The data being transmitted while the self-driving vehicle 110 is within the environment proximity threshold of the enhanced network region can be extensive and may not be restricted.

Continuing with FIG. 5, another communication condition can relate to the functionalities available at the self-driving vehicles 110. Each self-driving vehicle 110 can have different physical functional attributes (e.g., robotic arms with various end effectors, sensors, payload transport components, payload-carrying and conveyance mechanisms, etc.) and/or different software applications (e.g., analysis applications, image capture applications, etc.). When the fleet management system 120 determines that a functionality requirement is satisfied by the self-driving vehicle 110, the fleet management system 120 can then select the corresponding data portion for transmitting to that self-driving vehicle 110.

An example physical functional attribute can include a manipulator that can be mounted to the self-driving vehicle 110. Example manipulators can include a conveyor, an end effector or other tool, etc. An example software application can include an advanced image processing application.

Another example communication condition can be in respect of a team identifier. The fleet management system 120 can assign one or more self-driving vehicles 110 to at least one team. Each team can be identified by a team identifier and each member of the team can be identifiable by the team member identifier. Each team can be composed of self-driving vehicles 110 with similar functionalities (e.g., all self-driving vehicles 110 with the gripper end effector are assigned to one team), or can be composed of self-driving vehicles 110 with distinct functionalities so that, together, they can operate to complement each other for completing certain types of missions. For example, a team could be designated for responding to high priority missions and so, that team can be composed of self-driving vehicles 110 with advanced physical attributes and/or software applications. Another example team can be a team assigned for navigating the environment for collecting data for updating the electronic map of the environment. The self-driving vehicles 110 assigned to this team can have advanced imaging applications, for example. Another example team can include self-driving vehicles 110 assigned to service a specific region of the environment.

In some embodiments, the team members can be assigned to the teams based on user inputs.

The fleet management system 120 can compare the team member identifier of a self-driving vehicle 110 with the team identifier of the team being requested to determine whether that self-driving vehicle 110 satisfy the team requirement. If satisfied, the fleet management system 120 can select the data portion associated with a position of each self-driving vehicle 110 and a current mission of each self-driving vehicle to be transmitted to the team members.

At 640, the fleet management system 120 transmits the selected data portion to the identified set of self-driving vehicles via the communication network 130. In response to the selected data portion, the self-driving vehicles 110 can determine a response based on the received data.

Figure 10:
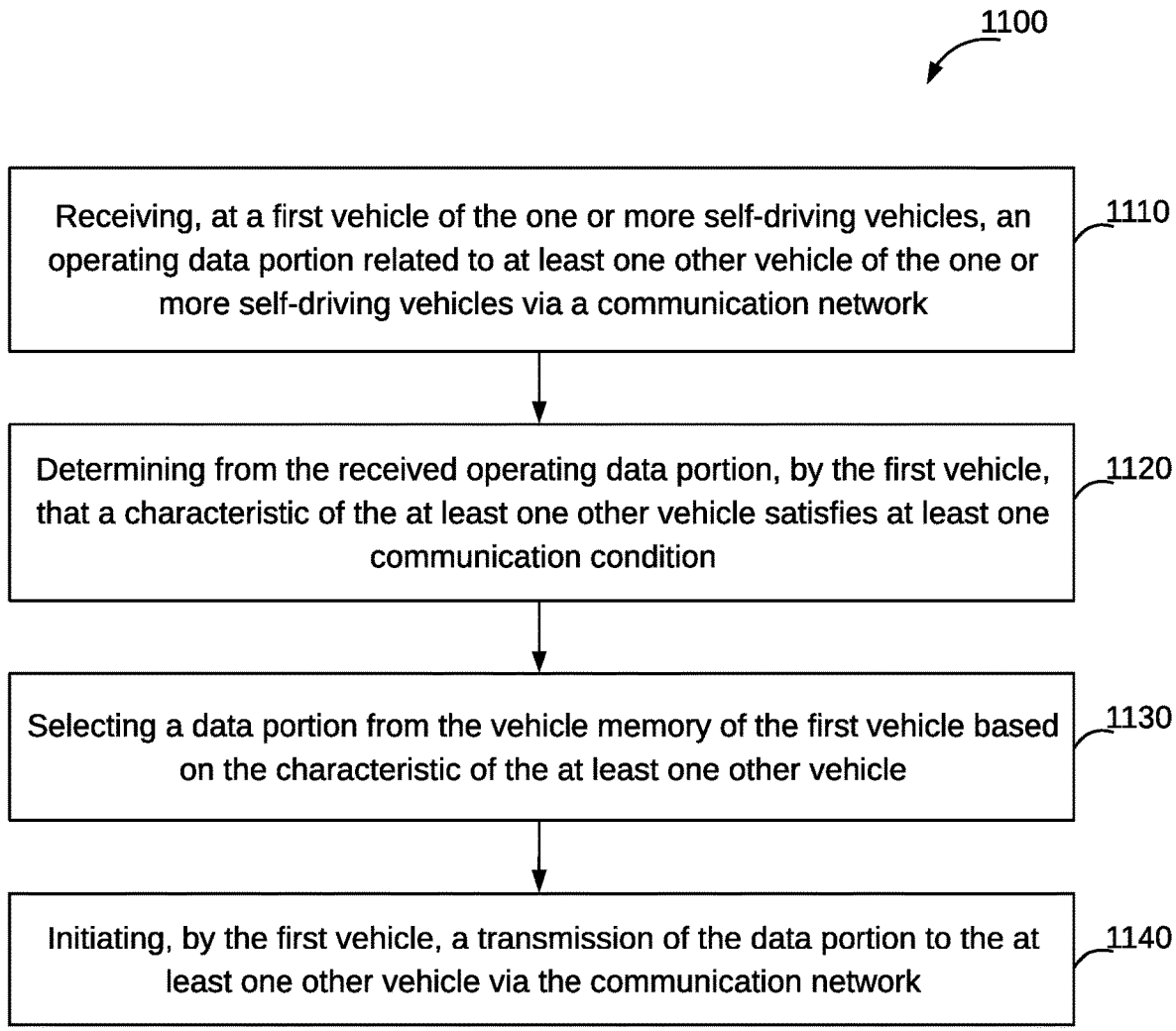
FIG. 10 is an example method of providing inter-vehicle communication, according to at least one embodiment.

Reference will now be made to FIG. 10, which shows an example method 1100 of providing inter-vehicle communication between one or more self-driving vehicles 110.

At 1110, a first self-driving vehicle 110a can receive an operating data portion related to at least one other self-driving vehicle, such as 110b or 110c, via the communication network 130. The first self-driving vehicle 110a can receive the operating data portion from the fleet management system 120 or another self-driving vehicle, such as 110b or 110c.

At 1020, the first self-driving vehicle 110a can determine from the received operating data portion that a characteristic of the other self-driving vehicle, such as 110b or 110c, satisfies at least one communication condition discussed herein.

For example, the characteristic can be a position of the other self-driving vehicle 110b and the communication condition can be the vehicular proximity threshold 704 between a position of the first self-driving vehicle 110a and the position of the other self-driving vehicle 110b. Another example communication condition can be the environment proximity threshold between the other self-driving vehicle 110b and one or more features of its environment.

Another example characteristic of the other self-driving vehicle 110b can be an available functionality and the communication conditions can be a functionality requirement. In another example, the characteristic can be a team member identifier and the communication condition can be a team identifier.

Another characteristic can be related to the mission assigned to the other self-driving vehicle 110c. The mission assigned to the self-driving vehicles 110 can have different priority levels—higher priority missions can be prioritized over lower priority missions. The communication condition can be a priority threshold that defines a minimum priority required for triggering the data communication, or a comparison of the priority of the missions assigned to the two self-driving vehicles 110. When the first self-driving vehicle 110a determines that the priority of the mission assigned to the other self-driving vehicle 110b exceeds the priority threshold or is higher than the priority of the mission assigned to the first self-driving vehicle 110a, the first self-driving vehicle 110a can determine that the communication condition is satisfied and select the relevant data portion to transmit to the other self-driving vehicle 110b. For example, the first self-driving vehicle 110a can determine that it should yield to the other self-driving vehicle 110b and transmit data related to its yield decision.

At 1130, the first self-driving vehicle 110a can select a data portion from its memory 244 based on the identified characteristic of the other self-driving vehicle 110b. The data portion selected can vary with the characteristic that satisfied the communication condition as different data may be relevant to the resulting communication session. It is possible for multiple communication conditions to be satisfied.

For example, when the vehicular proximity threshold is satisfied, the first self-driving vehicle 110a can transmit data related to its position and velocity to the other self-driving vehicle 110b. As the self-driving vehicles 110a, 110b are close in proximity, it can be useful for the other self-driving vehicle 110b to be aware of the presence of the first self-driving vehicle 110a as the other self-driving vehicle 110b can adjust its planned path to avoid any collision with the first self-driving vehicle 110a. Other data that can be transmitted by the first self-driving vehicle 110a to the other self-driving vehicle 110b can include the mission of the first self-driving vehicle 110a, for example.

When the environment proximity threshold is satisfied, the first self-driving vehicle 110a can transmit data related to its position, its velocity and its mission, for example. It is possible that the other self-driving vehicle 110b may require the first self-driving vehicle 110a to complete its mission, as described with reference to FIG. 9. Accordingly, data related to the mission being carried out by the first self-driving vehicle 110a can be relevant as that mission may have higher priority than the mission assigned to the other self-driving vehicle 110b.

When the functionality requirement is satisfied, the first self-driving vehicle 110a can transmit data related to its position and its current mission. The other self-driving vehicle 110b may only require the position of the first self-driving vehicle 110a and its mission to determine whether the first self-driving vehicle 110b can assist with another mission, for example. The velocity of the first self-driving vehicle 110a may not be as relevant.

When the team identifier is satisfied, the first self-driving vehicle 110a can transmit data related to its current mission.

At 1140, the first self-driving vehicle 110a can initiate a transmission of the selected data portion to the other self-driving vehicle 110b via the communication network 130.

The other self-driving vehicle 110b can receive the data portion from the first self-driving vehicle 110a and determine a response based on the received data portion.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method of providing inter-vehicle communication between one or more self-driving vehicles, each self-driving vehicle comprising a vehicle processor and a vehicle memory, the method comprising:

receiving, at a first vehicle of the one or more self-driving vehicles, an operating data portion related to at least one other vehicle of the one or more self-driving vehicles via a communication network, the operating data including data for executing at least one mission to be completed by the one or more self-driving vehicles, completion of the at least one mission requiring one or more vehicle characteristics;

identifying, by the first vehicle, a position and a velocity of the at least one other vehicle and vehicle characteristics of the at least one other vehicle from the received operating data portion, the vehicle characteristics defining a current status of the at least one other vehicle;

determining, by the first vehicle, that at least one vehicle characteristic of the at least one other vehicle satisfies at least one communication condition for initiating a communication transmission between the first vehicle and the at least one other vehicle, the at least one vehicle characteristic being related to the one or more vehicle characteristics required for completing the at least one mission;

in response to determining that the at least one vehicle characteristic of the at least one other vehicle satisfies the at least one communication condition and that the position and the velocity of the at least one other vehicle relative to a position and a velocity of the first vehicle is not within a vehicular proximity threshold, the first vehicle selecting a stored data portion from the vehicle memory of the first vehicle based on the position, the velocity and the at least one vehicle characteristic of the at least one other vehicle, the stored data portion including data for executing the at least one mission;

initiating, by the first vehicle, a transmission of the stored data portion to the at least one other vehicle via the communication network;

receiving, at the at least one other vehicle, the stored data portion from the first vehicle;

determining, by the at least one other vehicle, one or more responses based on the received stored data portion, the one or more responses comprising control instructions to operate the at least one other vehicle to at least partially execute the at least one mission; and automatically controlling the at least one other vehicle to perform the one or more responses.

2. The method of claim 1, wherein the one or more responses comprise adjusting a planned path of the at least one other vehicle.

3. The method of claim 2, wherein adjusting a planned path of the at least one other vehicle comprises yielding to the first vehicle.

4. The method of claim 1, wherein the one or more responses comprise modifying a current mission of the at least one other vehicle.

5. The method of claim 1, wherein:
the at least one vehicle characteristic of the at least one other vehicle comprises a priority of a current mission of the at least one other vehicle;
the at least one communication condition comprises a priority threshold; and
in response to determining that the priority of the current mission of the at least one other vehicle satisfies the priority threshold, the first vehicle selects the stored data portion associated with a current mission of the first vehicle.

6. The method of claim 1, wherein:
the at least one vehicle characteristic of the at least one other vehicle comprises a priority of a current mission of the at least one other vehicle;
the at least one communication condition comprises a priority difference with a priority of a current mission of the first vehicle; and
in response to determining that the priority of the current mission of the at least one other vehicle exceeds the priority of the current mission of the first vehicle by at least the priority difference, the first vehicle selects the stored data portion associated with the current mission of the first vehicle.

7. The method of claim 1, wherein:
the at least one vehicle characteristic of the at least one other vehicle comprises a position of the at least one other vehicle;
the at least one communication condition comprises an environment proximity threshold between the at least one other vehicle and one or more features of an environment of the one or more self-driving vehicles; and
in response to determining that the position of the at least one other vehicle is within the environment proximity threshold of the one or more features of the environment of the one or more self-driving vehicles, the first vehicle selects the stored data portion associated with a position of the first vehicle, a velocity of the first vehicle and a current mission of the first vehicle.

8. The method of claim 1, wherein:
the at least one vehicle characteristic of the at least one other vehicle comprises a functionality of the at least one other vehicle;
the at least one communication condition comprises a functionality requirement; and
in response to determining that the functionality of the at least one other vehicle satisfies the functionality requirement, the first vehicle selects the stored data portion associated with a position of the first vehicle and a current mission of the first vehicle.

9. The method of claim 1, wherein:
the at least one vehicle characteristic of the at least one other vehicle comprises a team member identifier;
the at least one communication condition comprises a team identifier; and
in response to determining that the team member identifier of the at least one other vehicle is associated with a team identifier of the first vehicle, the first vehicle selects the stored data portion associated with a current mission of the first vehicle.

10. The method of claim 1, wherein the vehicular proximity threshold varies with the velocity of the first vehicle.

11. An inter-vehicle communication system, the system comprising:
a communication network; and
a plurality of self-driving vehicles operable to communicate with each other via the communication network, each self-driving vehicle comprising a vehicle memory and a vehicle processor, wherein:
the vehicle processor of a first self-driving vehicle is operable to:
receive an operating data portion related to at least one other vehicle of the plurality self-driving vehicles via the communication network, the operating data including data for executing at least one mission to be completed by the plurality of self-driving vehicles, completion of the at least one mission requiring one or more vehicle characteristics;
identify a position and a velocity of the at least one other vehicle and vehicle characteristics of the at least one other vehicle from the received operating data portion, the vehicle characteristics defining a current status of the at least one other vehicle;
determine that at least one vehicle characteristic of the at least one other vehicle satisfies at least one communication condition for initiating a communication transmission between the first vehicle and the at least one other vehicle, the at least one vehicle characteristic being related to the one or more vehicle characteristics required for completing the at least one mission;
in response to determining that the at least one vehicle characteristic of the at least one other vehicle satisfies the at least one communication condition and that the position and the velocity of the at least one other vehicle relative to a position and a velocity of the first vehicle is not within a vehicular proximity threshold, the first vehicle selects a stored data portion from the vehicle memory based on the position, the velocity and the at least one vehicle characteristic of the at least one other vehicle, the stored data portion including data for executing the at least one mission; and
initiate a transmission of the stored data portion to the at least one other vehicle via the communication network; and the vehicle processor of the at least one other self-driving vehicle is operable to:
  receive stored data portion from the first vehicle;
  determine one or more responses based on the received stored data portion, the one or more responses comprising control instructions to operate the at least one other vehicle to at least partially execute the at least one mission; and
  automatically control the at least one other self-driving vehicle to perform the one or more responses.

12. The system of claim 11, wherein the one or more responses comprise adjusting a planned path of the at least one other vehicle.

13. The system of claim 12, wherein adjusting a planned path of the at least one other vehicle comprises yielding to the first vehicle.

14. The system of claim 11, wherein the one or more responses comprise modifying a current mission of the at least one other vehicle.

15. The system of claim 11, wherein:
the at least one vehicle characteristic of the at least one other vehicle comprises a priority of a current mission of the at least one other vehicle;
the at least one communication condition comprises a priority threshold; and
in response to determining that the priority of the current mission of the at least one other vehicle satisfies the priority threshold, the first vehicle selects the stored data portion associated with a current mission of the first vehicle.

16. The system of claim 11, wherein:
the at least one vehicle characteristic of the at least one other vehicle comprises a priority of a current mission of the at least one other vehicle;
the at least one communication condition comprises a priority difference with a priority of a current mission of the first vehicle; and
in response to determining that the priority of the current mission of the at least one other vehicle exceeds the priority of the current mission of the first vehicle by at least the priority difference, the first vehicle selects the stored data portion associated with the current mission of the first vehicle.

17. The system of claim 11, wherein:
the at least one vehicle characteristic of the at least one other vehicle comprises a position of the at least one other vehicle;
the at least one communication condition comprises an environment proximity threshold between the at least one other vehicle and one or more features of an environment of the one or more self-driving vehicles; and
in response to determining that the position of the at least one other vehicle is within the environment proximity threshold of the one or more features of the environment of the one or more self-driving vehicles, the first vehicle selects the stored data portion associated with a position of the first vehicle, a velocity of the first vehicle and a current mission of the first vehicle.

18. The system of claim 11, wherein:
the at least one vehicle characteristic of the at least one other vehicle comprises a functionality of the at least one other vehicle;
the at least one communication condition comprises a functionality requirement; and
in response to determining that the position of the at least one other vehicle is within the environment proximity threshold of the one or more features of the environment of the one or more self-driving vehicles, the first vehicle selects the stored data portion associated with a position of the first vehicle and a current mission of the first vehicle.

19. The system of claim 11, wherein:
the at least one vehicle characteristic of the at least one other vehicle comprises a team member identifier;
the at least one communication condition comprises a team identifier; and
in response to determining that the team member identifier of the at least one other vehicle is associated with a team identifier of the first vehicle, the first vehicle selects the stored data portion associated with a current mission of the first vehicle.

20. The system of claim 11, wherein the vehicular proximity threshold varies with the velocity of the first vehicle.

* * * * *